United States Patent
Watson et al.

(10) Patent No.: US 11,430,105 B2
(45) Date of Patent: Aug. 30, 2022

(54) WORKPIECE INSPECTION AND DEFECT DETECTION SYSTEM INCLUDING MONITORING OF WORKPIECE IMAGES

(71) Applicant: Mitutoyo Corporation, Kanagawa-ken (JP)

(72) Inventors: William Todd Watson, Kirkland, WA (US); Robert Kamil Bryll, Bothell, WA (US); Shannon Roy Campbell, Woodinville, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 159 days.

(21) Appl. No.: 16/902,181

(22) Filed: Jun. 15, 2020

(65) Prior Publication Data

US 2021/0390681 A1 Dec. 16, 2021

(51) Int. Cl.
*G06T 7/00* (2017.01)

(52) U.S. Cl.
CPC .. *G06T 7/0004* (2013.01); *G06T 2207/20081* (2013.01); *G06T 2207/30164* (2013.01)

(58) Field of Classification Search
CPC . G06T 2207/20081; G06T 2207/30164; G06T 7/0004
See application file for complete search history.

(56) References Cited

U.S. PATENT DOCUMENTS

| | | | |
|---|---|---|---|
| 5,982,920 A | 11/1999 | Tobin, Jr. et al. | |
| 6,718,526 B1 | 4/2004 | Eldredge et al. | |
| 6,885,977 B2 | 4/2005 | Gavra et al. | |
| 7,030,351 B2 | 4/2006 | Wasserman et al. | |
| 7,324,682 B2 | 1/2008 | Wasserman | |
| 7,359,544 B2 | 4/2008 | Gao et al. | |
| 7,454,053 B2 | 11/2008 | Bryll et al. | |

(Continued)

FOREIGN PATENT DOCUMENTS

WO 2019/133234 A1 7/2019

OTHER PUBLICATIONS

Mitutoyo Corporation & Micro Encoder Inc. "QVPAK® 3D CNC Vision Measuring Machine," User's Guide, Version 7, 2003, 329 pages.

(Continued)

*Primary Examiner* — Bobbak Safaipour
(74) *Attorney, Agent, or Firm* — Seed IP Law Group LLP

(57) ABSTRACT

A workpiece inspection and defect detection system includes a light source, a lens that inputs image light arising from a surface of a workpiece, and a camera that receives imaging light transmitted along an imaging optical path. The system utilizes images of workpieces acquired with the camera as training images to train a defect detection portion to detect defect images that include workpieces with defects. Anomaly detector classification characteristics are determined based on features of the training images. Run mode images of workpieces are acquired with the camera, and based on determined features from the images, the anomaly detector classification characteristics are utilized to determine if the images of the workpieces are classified as anomalous. In addition, the defect detection portion determines if images are defect images that include workpieces with defects and for which additional operations may be performed (e.g., metrology operations for measuring dimensions of the defects, etc.)

21 Claims, 22 Drawing Sheets

(56) References Cited

U.S. PATENT DOCUMENTS

| | | |
|---|---|---|
| 7,522,763 B2 | 4/2009 | Tessadro |
| 7,570,795 B2 | 8/2009 | Yu et al. |
| 7,602,962 B2 | 10/2009 | Miyamoto et al. |
| 7,627,162 B2 * | 12/2009 | Blanford ............... G06T 7/0004 |
| | | 356/615 |
| 7,676,077 B2 | 3/2010 | Kulkarni et al. |
| 8,111,905 B2 | 2/2012 | Campbell |
| 8,111,938 B2 | 2/2012 | Bryll et al. |
| 8,135,204 B1 | 3/2012 | Chen et al. |
| 8,165,837 B1 | 4/2012 | Paramasivam et al. |
| 8,254,661 B2 | 8/2012 | Auerbach |
| 8,255,172 B2 | 8/2012 | Auerbach |
| 8,315,453 B2 | 11/2012 | Shlain et al. |
| 8,437,534 B2 | 5/2013 | Shibuya et al. |
| 8,452,076 B2 | 5/2013 | Nakagaki et al. |
| 8,553,970 B2 | 10/2013 | Auerbach |
| 9,013,574 B2 | 4/2015 | Saylor et al. |
| 9,143,674 B2 | 9/2015 | Gladnick |
| 9,167,215 B2 | 10/2015 | Delaney et al. |
| 9,430,743 B2 | 8/2016 | Plihal |
| 9,430,824 B2 | 8/2016 | Sezginer et al. |
| 9,607,233 B2 | 3/2017 | Kaizerman et al. |
| 9,613,255 B2 | 4/2017 | Amzaleg et al. |
| 9,613,411 B2 | 4/2017 | Konuru et al. |
| 9,639,083 B2 | 5/2017 | Tseo et al. |
| 9,646,425 B2 | 5/2017 | Yu et al. |
| 9,715,723 B2 | 7/2017 | Shlain et al. |
| 10,043,264 B2 | 8/2018 | Greenberg et al. |
| 10,436,720 B2 | 10/2019 | He et al. |
| 10,482,590 B2 | 11/2019 | He et al. |
| 10,520,301 B1 | 12/2019 | Tobiason |
| 10,748,271 B2 | 8/2020 | Asbag et al. |
| 10,880,468 B1 * | 12/2020 | Bryll ..................... G02B 21/361 |
| 11,150,200 B1 * | 10/2021 | Watson ............... G01N 21/8851 |
| 2004/0156540 A1 | 8/2004 | Gao et al. |
| 2007/0156379 A1 | 7/2007 | Kulkarni et al. |
| 2007/0230770 A1 | 10/2007 | Kulkarni et al. |
| 2007/0288219 A1 | 12/2007 | Zafar et al. |
| 2009/0080759 A1 | 3/2009 | Bhaskar et al. |
| 2010/0158343 A1 * | 6/2010 | Bryll ........................ G02B 7/36 |
| | | 382/141 |
| 2011/0103679 A1 * | 5/2011 | Campbell ................. G02B 7/36 |
| | | 382/152 |
| 2011/0133054 A1 * | 6/2011 | Campbell .......... G01B 11/0608 |
| | | 356/609 |
| 2012/0154571 A1 * | 6/2012 | Bryll .................... G06V 10/141 |
| | | 382/152 |
| 2013/0279795 A1 | 10/2013 | Shlain et al. |
| 2015/0254832 A1 | 9/2015 | Plihal |
| 2016/0189055 A1 | 6/2016 | Zvitia |
| 2016/0299493 A1 | 10/2016 | Yu et al. |
| 2018/0130199 A1 | 5/2018 | Brauer et al. |
| 2018/0197714 A1 | 7/2018 | Plihal et al. |
| 2018/0204315 A1 | 7/2018 | Plihal et al. |
| 2019/0067060 A1 | 2/2019 | Plihal et al. |
| 2019/0073566 A1 | 3/2019 | Brauer |
| 2019/0104302 A1 * | 4/2019 | Gladnick ........... G02B 21/0016 |
| 2019/0147283 A1 | 5/2019 | Giering et al. |
| 2019/0188543 A1 * | 6/2019 | Tamai .................. G06K 9/6262 |
| 2019/0228519 A1 * | 7/2019 | Guo ..................... G06V 10/443 |
| 2020/0064278 A1 * | 2/2020 | Satai ................... G01N 21/8806 |
| 2021/0078062 A1 * | 3/2021 | Takahashi ............. G01L 5/0052 |
| 2021/0118091 A1 * | 4/2021 | Betz ..................... G01B 11/005 |
| 2021/0264147 A1 * | 8/2021 | Kadambi ............... G06V 10/82 |

OTHER PUBLICATIONS

Zeiler et al., "Visualizing and Understanding Convolutional Networks," arXiv:1311.2901v3, Nov. 28, 2013, 11 pages.

* cited by examiner

WORKPIECE INSPECTION AND DEFECT DETECTION SYSTEM INCLUDING MONITORING OF WORKPIECE IMAGES

FIELD

This disclosure relates to workpiece inspection systems, and more particularly to precision machine vision systems for inspecting workpieces and detecting defects.

BACKGROUND

Precision non-contact workpiece inspection systems such as machine vision inspection systems (or "vision systems" for short) may be utilized to obtain images of workpieces for inspection. Such systems may be utilized for various types of applications (e.g., general workpiece inspection, metrology applications for determining precise dimensional measurements of workpieces, etc.) Such systems generally include a computer, a camera and optical system. In certain configurations, a movement mechanism (e.g., a precision stage, a conveyor, etc.) may be included that moves to allow workpiece traversal and inspection. One exemplary prior art machine vision inspection system is the QUICK VISION® series of PC-based vision systems and QVPAK® software available from Mitutoyo America Corporation (MAC), located in Aurora, Ill. The features and operation of the QUICK VISION® series of vision systems and the QVPAK® software are generally described, for example, in the QVPAK 3D CNC Vision Measuring Machine User's Guide, published January 2003, which is hereby incorporated herein by reference in its entirety. This type of system uses a microscope-type optical system and moves the stage to provide inspection images of workpieces.

Such machine vision inspection systems have typically faced various types of challenges for inspecting workpieces (e.g., due to variations in the types or surfaces of the workpieces being inspected, changing inspection conditions, etc.) A system that can provide improvements with respect to such issues for certain types of inspection operations (e.g., for workpiece defect detection and/or improved accuracy for detecting defects) would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A workpiece inspection and defect detection system is provided including a light source, a lens, a camera, one or more processors, and a memory. The lens inputs image light arising from a surface of a workpiece which is illuminated by the light source, and transmits the image light along an imaging optical path. The camera receives imaging light transmitted along the imaging optical path and provides an image of the workpiece.

The memory is coupled to the one or more processors and stores program instructions that when executed by the one or more processors cause the one or more processors to at least: acquire a plurality of training images, wherein at least some of the plurality of training images are utilized to train a defect detection portion; determine a plurality of training image features from the plurality of training images; determine a plurality of anomaly detector classification characteristics based at least in part on the determined training image features; utilize the camera to acquire a first run mode image of a workpiece; determine a plurality of features from the first run mode image of the workpiece; and based at least in part on the determined features from the first run mode image of the workpiece, utilize the anomaly detector classification characteristics to determine if the first run mode image of the workpiece is to be classified as anomalous.

In various implementations, the anomaly detector classification characteristics may be utilized to determine that a second run mode image of a workpiece is to be classified as non-anomalous. In addition, the defect detection portion may be utilized to analyze the second run mode image to determine if the second run mode image of the workpiece is to be classified as a defect image that includes a defect of the workpiece.

In various implementations, the first run mode image of the workpiece may be classified as anomalous in accordance with the utilization of the anomaly detector classification characteristics. In addition, a message may be generated indicating that there is a problem with at least one of an imaging condition, a lighting condition, or a workpiece condition based at least in part on the classification of the first run mode image of the workpiece as anomalous. In addition, a reason may be determined as to why the first run mode image of the workpiece has been classified as anomalous. Furthermore, a message may be generated indicating the reason that the first run mode image of the workpiece is classified as anomalous. In various implementations, after the reason that the first run mode image is classified as anomalous is determined, an adjustment may be made to at least one of a brightness of the light source, or a position of a light source, or a position of the lens or lens elements relative to at least one of the camera or workpiece.

In various implementations, a synthetic dataset may be created in which a plurality of the training image features are altered to simulate anomalous images and are not altered to simulate non-anomalous images. In addition, a two-class classifier may be trained to be capable of distinguishing anomalous and non-anomalous images in the synthetic dataset.

In various implementations, a method may be provided (e.g., a computer-implemented method operated under control of one or more computing systems configured with executable instructions) for operating a workpiece inspection and defect detection system, the method comprising: utilizing a light source, a lens and a camera of the workpiece inspection and defect detection system for acquiring a plurality of training images, wherein at least some of the plurality of training images are utilized to train a defect detection portion; determining a plurality of training image features from the training images; determining a plurality of anomaly detector classification characteristics based at least in part on the training image features; acquiring a first run mode image of a workpiece; determining a plurality of features from the first run mode image of the workpiece; and based at least in part on the determined features from the first run mode image of the workpiece, utilizing the anomaly detector classification characteristics to determine if the first run mode image of the workpiece is to be classified as anomalous.

In various implementations, a non-transitory computer-readable medium may be provided as storing program instructions that when executed by one or more processors cause the one or more processors to at least: utilize a light source, a lens and a camera of a workpiece inspection and defect detection system to acquire a plurality of training images, wherein at least some of the plurality of training images are utilized to train a defect detection portion; determine a plurality of training image features from the plurality of training images; determine a plurality of anomaly detector classification characteristics based at least in part on the determined training image features; utilize the camera to acquire a first run mode image of a workpiece; determine a plurality of features from the first run mode image of the workpiece; and based at least in part on the determined features from the first run mode image of the workpiece, utilize the anomaly detector classification characteristics to determine if the first run mode image of the workpiece is to be classified as anomalous.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
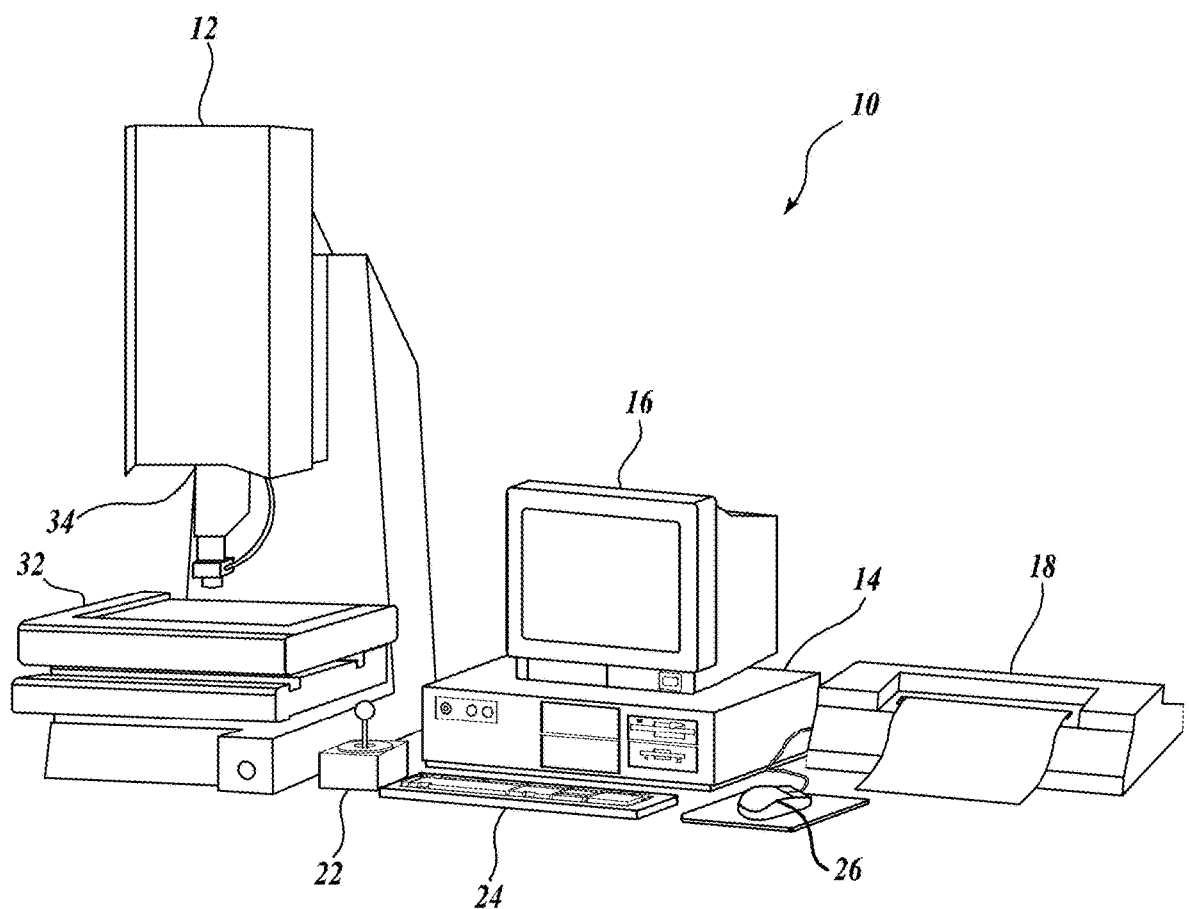
FIG. 1 is a diagram showing various typical components of a general-purpose precision machine vision inspection system.

FIG. 1 is a block diagram of one exemplary machine vision inspection system 10 usable as an imaging system in accordance with methods described herein. The machine vision inspection system 10 includes a vision inspection machine 12 that is operably connected to exchange data and control signals with a controlling computer system 14. The controlling computer system 14 is further operably connected to exchange data and control signals with a monitor or display 16, a printer 18, a joystick 22, a keyboard 24, and a mouse 26. The monitor or display 16 may display a user interface suitable for controlling and/or programming the operations of the machine vision inspection system 10. It will be appreciated that in various exemplary implementations, a touchscreen tablet and/or similar devices or the like may be substituted for and/or redundantly provide the functions of any or all of the elements 14, 16, 22, 24 and 26.

Those skilled in the art will appreciate that the controlling computer system 14 and/or other control systems described herein may generally be implemented using any suitable computing system or device, including distributed or networked computing environments, and the like. Such computing systems or devices may include one or more general-purpose or special-purpose processors (e.g., non-custom or custom devices) that execute software to perform the functions described herein. Software may be stored in memory, such as random-access memory (RAM), read-only memory (ROM), flash memory, or the like, or a combination of such components. Software may also be stored in one or more storage devices, such as optical-based disks, flash memory devices, or any other type of non-volatile storage medium for storing data. Software may include one or more program modules that include routines, programs, objects, components, data structures, and so on that perform particular tasks or implement particular abstract data types. In distributed computing environments, the functionality of the program modules may be combined or distributed across multiple computing systems or devices and accessed via service calls, either in a wired or wireless configuration.

The vision inspection machine 12 includes a moveable workpiece stage 32 and an optical imaging system 34 that may include a zoom lens or interchangeable objective lenses. The zoom lens or interchangeable objective lenses generally provide various magnifications for the images provided by the optical imaging system 34. Various exemplary implementations of the machine vision inspection system 10 are also described in commonly assigned U.S. Pat. Nos. 7,454,053; 7,324,682; 8,111,905; and 8,111,938, each of which is hereby incorporated herein by reference in its entirety.

Figure 2:
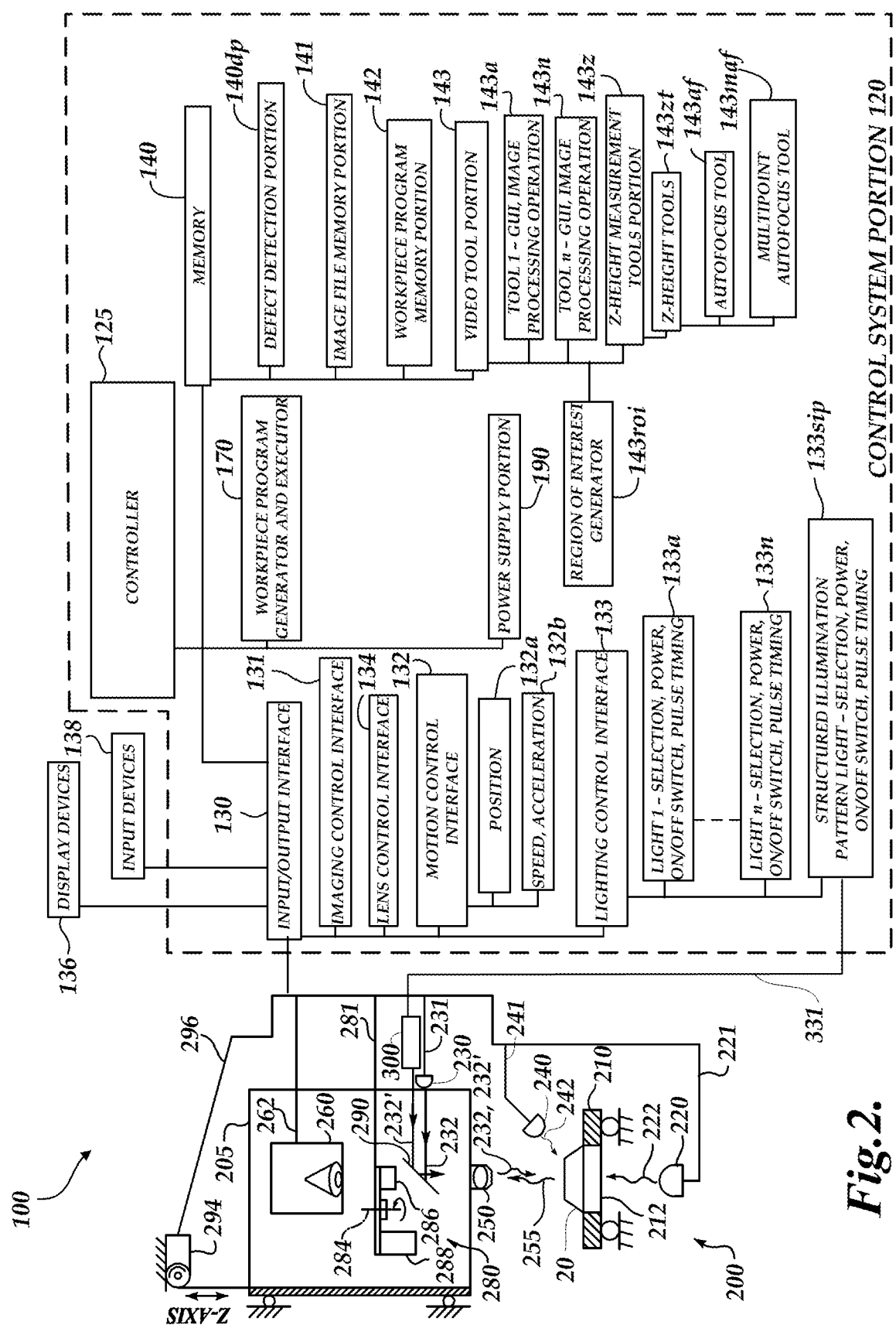
FIG. 2 is a block diagram of a control system portion and a vision components portion of a machine vision inspection system similar to that of FIG. 1 and including certain features disclosed herein.
Figure 3A:
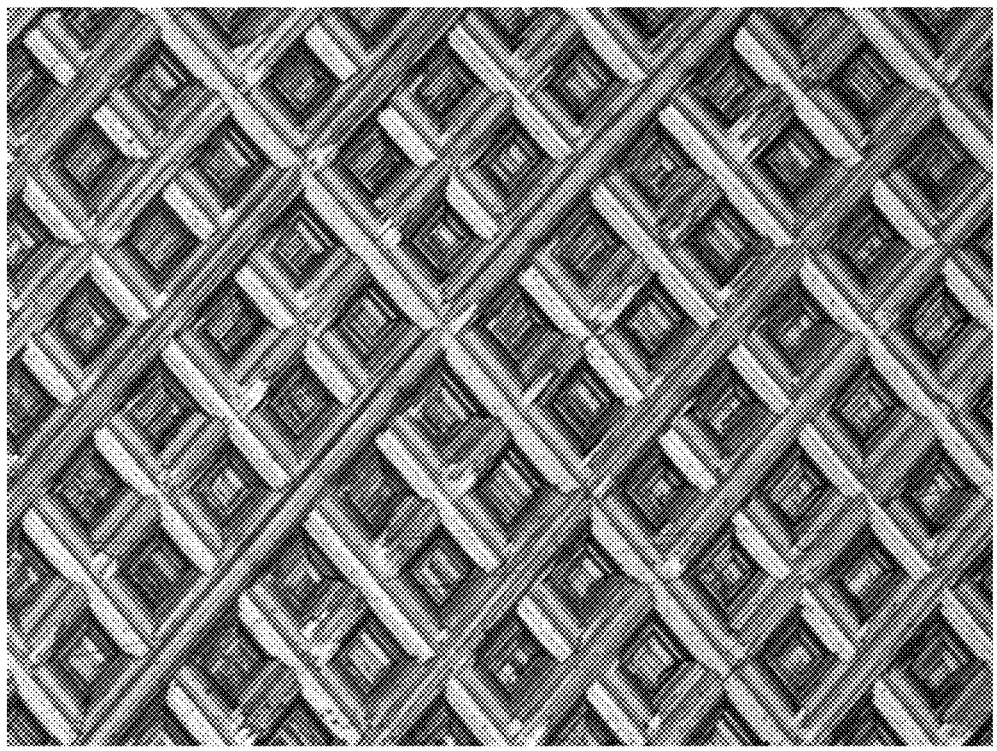
FIGS. 3A-3F are examples of images of portions of workpieces that do not include defects, as may be acquired using a machine vision inspection system similar to that of FIG. 1.
Figure 3B:
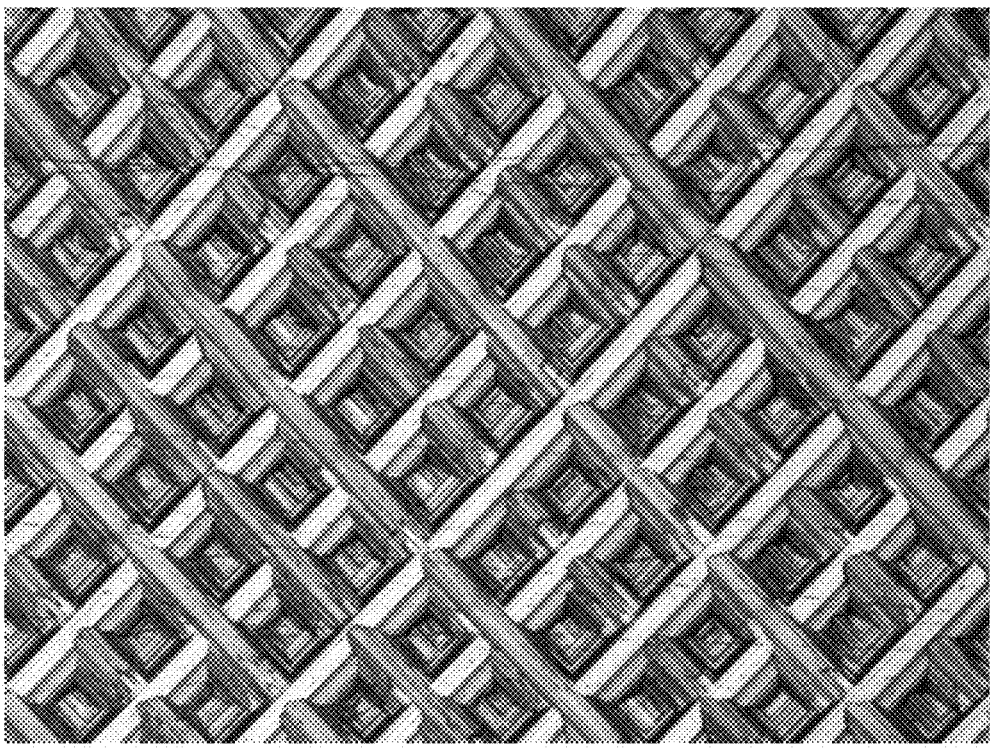
Figure 3C:
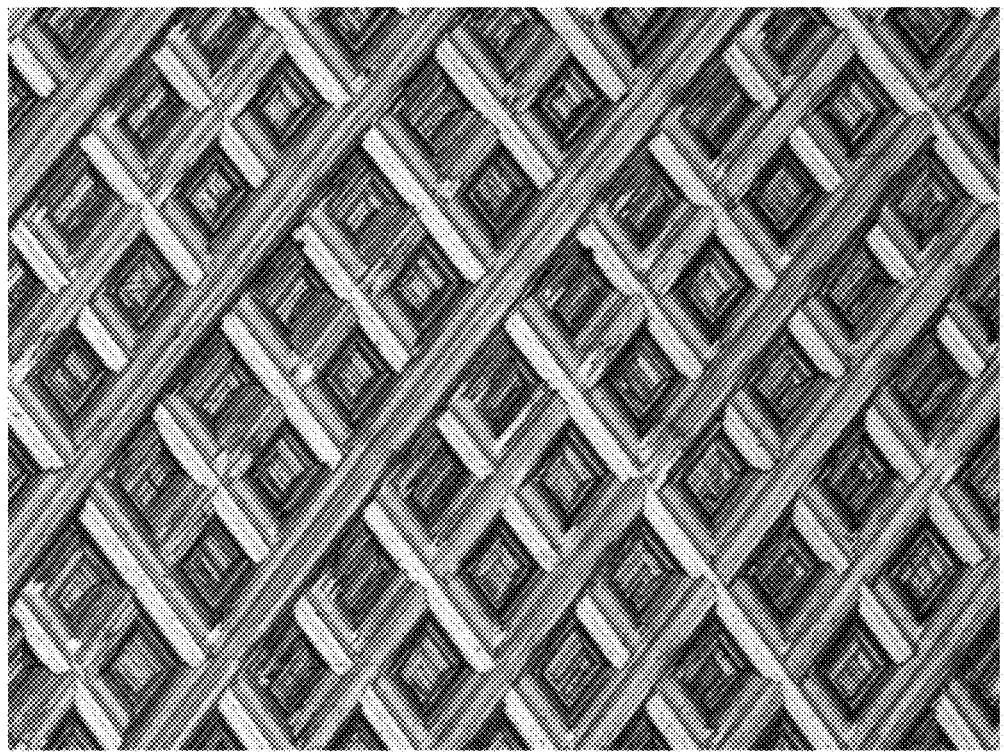
Figure 3D:
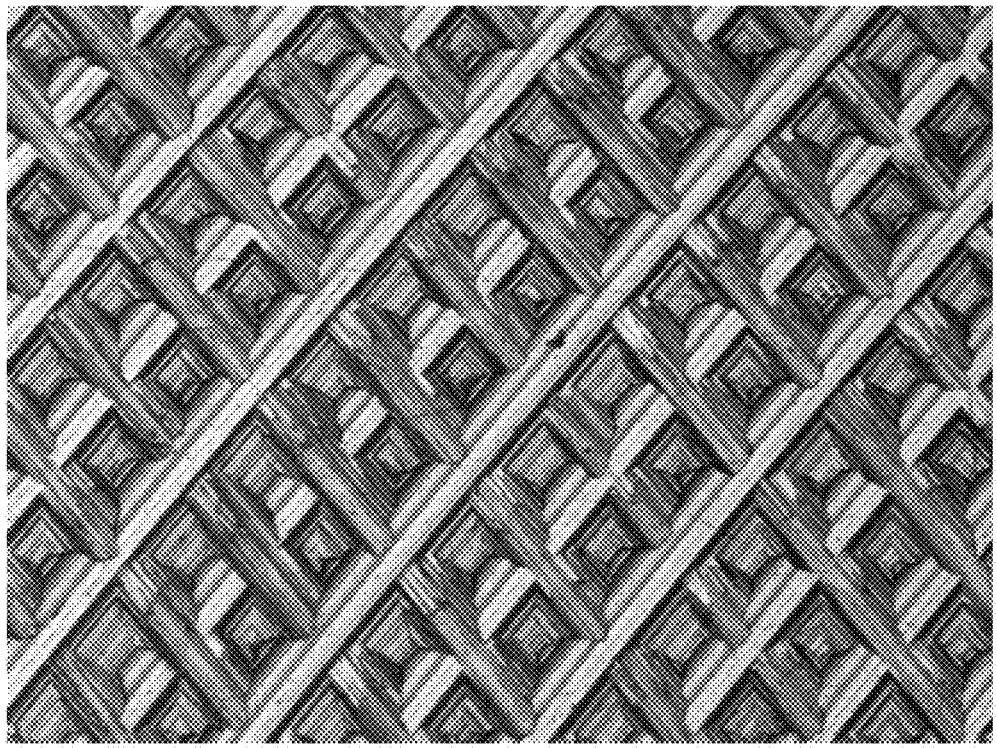
Figure 3E:
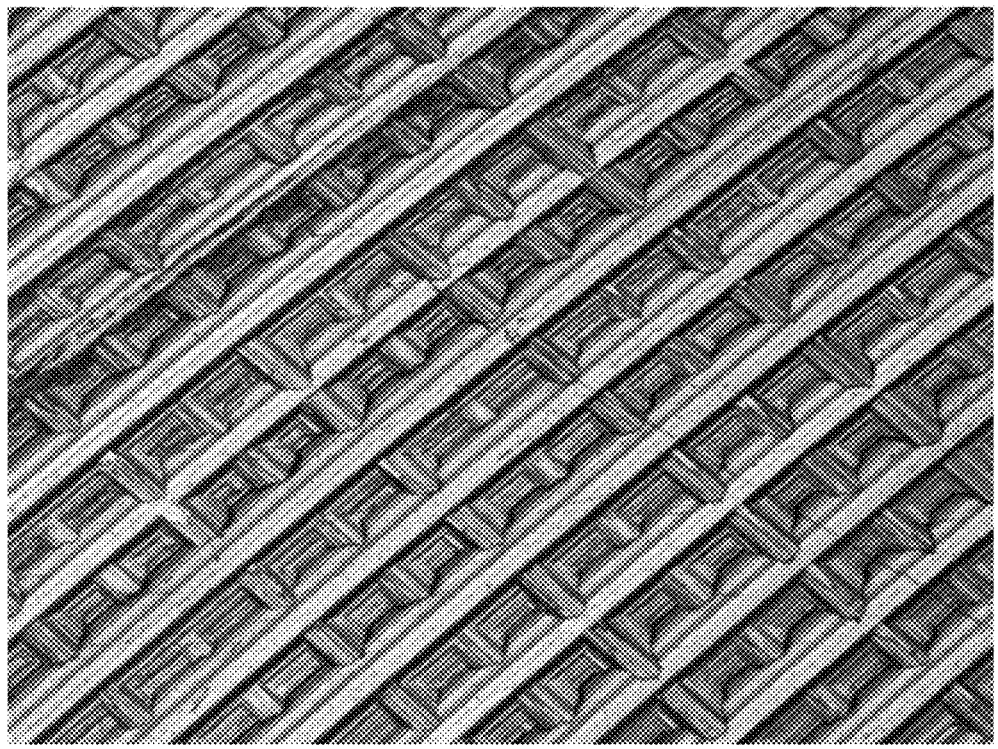
Figure 3F:
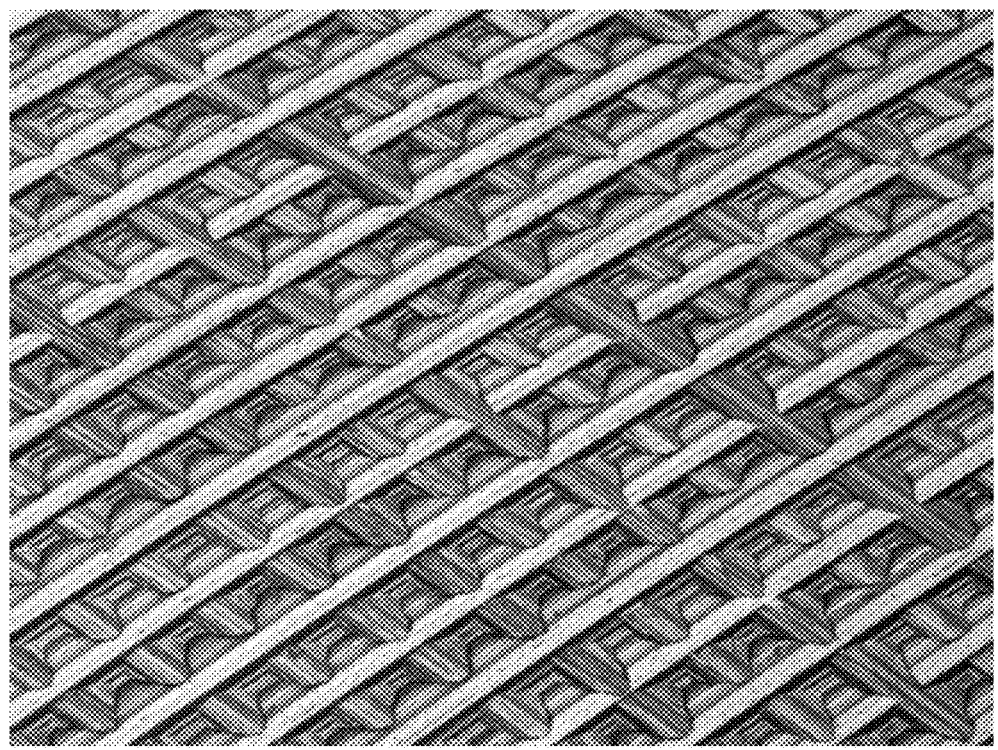

FIG. 2 is a block diagram of a control system portion 120 and a vision components portion 200 of a machine vision inspection system 100 similar to the machine vision inspection system of FIG. 1, including certain features disclosed herein. As will be described in more detail below, the control system portion 120 is utilized to control the vision components portion 200. The control system portion 120 may be arranged to exchange data and control signals with the vision components portion 200. The vision components portion 200 includes an optical assembly portion 205, light sources 220, 230, 240, 300, and a workpiece stage 210 having a central transparent portion 212. The workpiece stage 210 is controllably movable along x- and y-axes that lie in a plane that is generally parallel to the surface of the stage where a workpiece 20 may be positioned.

The optical assembly portion 205 includes a camera system 260 and an interchangeable objective lens 250. In some implementations, the optical assembly portion 205 may optionally include a variable focal length (VFL) lens, e.g., a tunable acoustic gradient (TAG) such as that disclosed in U.S. Pat. No. 9,143,674, which is hereby incorporated herein by reference in its entirety.

In various exemplary implementations, the optical assembly portion 205 may further include a turret lens assembly 223 having lenses 226 and 228. As an alternative to the turret lens assembly, in various exemplary implementations a fixed or manually interchangeable magnification-altering lens, or a zoom lens configuration, or the like, may be included. In various exemplary implementations, the interchangeable objective lens 250 may be selected from a set of fixed magnification objective lenses that are included as part of the variable magnification lens portion (e.g., a set of objective lenses corresponding to magnifications such as 0.5×, 1×, 2× or 2.5×, 5×, 10×, 20× or 25×, 50×, 100×, etc.).

The optical assembly portion 205 is controllably movable along a z-axis that is generally orthogonal to the x- and y-axes by using a controllable motor 294 that drives an actuator to move the optical assembly portion 205 along the z-axis to change the focus of the image of the workpiece 20. The controllable motor 294 is connected to an input/output interface 130 via a signal line 296, to change the focus of the image over a certain range. A workpiece 20 may be placed on the workpiece stage 210. The workpiece stage 210 may be controlled to move relative to the optical assembly portion 205, such that the field of view of the interchangeable objective lens 250 moves between locations on the workpiece 20, and/or among a plurality of workpieces 20.

One or more of a stage light source 220, a coaxial light source 230, and a surface light source 240 (e.g., a ring light) may emit source light 222, 232, and/or 242, respectively, to illuminate the workpiece or workpieces 20. For example, during an image exposure, the coaxial light source 230 may emit source light 232 along a path including a beam splitter 290 (e.g., a partial mirror). The source light 232 is reflected or transmitted as workpiece light 255, and the workpiece light used for imaging passes through the interchangeable objective lens 250 and the turret lens assembly 223 and is gathered by the camera system 260. A workpiece image exposure which includes the image of the workpiece(s) 20, is captured by the camera system 260, and is output on a signal line 262 to the control system portion 120.

Various light sources (e.g., the light sources 220, 230, 240, 300) may be connected to a lighting control interface 133 of the control system portion 120 through associated signal lines (e.g., the busses 221, 231, 241, 331, respectively). The control system portion 120 may control the turret lens assembly 223 to rotate along axis 224 to select a turret lens through a signal line or bus 223' to alter an image magnification.

As shown in FIG. 2, in various exemplary implementations, the control system portion 120 includes a controller 125, the input/output interface 130, a memory 140, a workpiece program generator and executor 170, and a power supply portion 190. Each of these components, as well as the additional components described below, may be interconnected by one or more data/control busses and/or application programming interfaces, or by direct connections between the various elements. The input/output interface 130 includes an imaging control interface 131, a motion control interface 132, a lighting control interface 133, and the lens control interface 134.

The lighting control interface 133 may include lighting control elements 133a-133n, that control, for example, the selection, power, and on/off switch for the various corresponding light sources of the machine vision inspection system 100. The lighting control interface 133 also includes a lighting control element 133sip that, in the illustrated embodiment, may work in conjunction with a structured illumination pattern (SIP) generating portion 300 to provide structured illumination during image acquisitions. In various implementations, a projected pattern may be output from the SIP generating portion 300 to be input to the beamsplitter 290, where it is directed as coaxial light through the objective lens 250 to provide SIP structured light 232' to illuminate the field of view.

The memory 140 may include an image file memory portion 141, a defect detection portion 140dp, a workpiece program memory portion 142 that may include one or more part programs, or the like, and a video tool portion 143. The video tool portion 143 includes video tool portion 143a and other video tool portions (e.g., 143n) that determine the GUI, image-processing operation, etc., for each of the corresponding video tools, and a region of interest (ROI) generator 143roi that supports automatic, semi-automatic, and/or manual operations that define various ROIs that are operable in various video tools included in the video tool portion 143. Examples of the operations of such video tools for locating edge features and performing other workpiece feature inspection operations are described in more detail in certain of the previously incorporated references, as well as in U.S. Pat. No. 7,627,162, which is hereby incorporated herein by reference in its entirety.

The video tool portion 143 also includes an autofocus video tool 143af that determines the GUI, image-processing operation, etc., for focus height measurement operations. In various exemplary implementations, the autofocus video tool 143af may additionally include a high-speed focus height tool that may be utilized to measure focus heights with high speed using hardware, as described in more detail in U.S. Pat. No. 9,143,674, which is hereby incorporated herein by reference in its entirety. In various exemplary implementations, the high-speed focus height tool may be a special mode of the autofocus video tool 143af that may otherwise operate according to conventional methods for autofocus video tools, or the operations of the autofocus video tool 143af may only include those of the high-speed focus height tool. High-speed autofocus and/or focus position determination for an image region or regions of interest may be based on analyzing the image to determine a corresponding quantitative contrast metric for various regions, according to known methods. For example, such methods are disclosed in U.S. Pat. Nos. 8,111,905; 7,570,795; and 7,030,351, which are hereby incorporated herein by reference in their entirety.

In the context of this disclosure, and as is known by one of ordinary skill in the art, the term "video tool" generally refers to a relatively complex set of automatic or programmed operations that a machine vision user can implement through a relatively simple user interface. For example, a video tool may include a complex pre-programmed set of image-processing operations and computations that are applied and customized in a particular instance by adjusting a few variables or parameters that govern the operations and computations. In addition to the underlying operations and computations, the video tool comprises the user interface that allows the user to adjust those parameters for a particular instance of the video tool. It should be noted that the visible user interface features are sometimes referred to as the video tool, with the underlying operations being included implicitly.

One or more display devices 136 (e.g., the display 16 of FIG. 1) and one or more input devices 138 (e.g., the joystick 22, keyboard 24, and mouse 26 of FIG. 1) may be connected to the input/output interface 130. The display devices 136 and input devices 138 may be used to display a user interface that may include various graphical user interface (GUI) features that are usable to perform inspection operations, and/or to create and/or modify part programs, to view the images captured by the camera system 260, and/or to directly control the vision components portion 200.

In various exemplary implementations, when a user utilizes the machine vision inspection system 100 to create a part program for the workpiece 20, the user generates part program instructions by operating the machine vision inspection system 100 in a learn mode to provide a desired image-acquisition training sequence. For example, a training sequence may comprise positioning a particular workpiece feature of a representative workpiece in the field of view (FOV), setting light levels, focusing or autofocusing, acquiring an image, and providing an inspection training sequence applied to the image (e.g., using an instance of one of the video tools on that workpiece feature). The learn mode operates such that the sequence(s) are captured or recorded and converted to corresponding part program instructions. These instructions, when the part program is executed, will cause the machine vision inspection system to reproduce the trained image acquisition and cause inspection operations to automatically inspect that particular workpiece feature (that is the corresponding feature in the corresponding location) on a run mode workpiece, or workpieces, which matches the representative workpiece used when creating the part program. In various exemplary implementations, certain types of training modes may also or alternatively be utilized (e.g., a training mode for training a defect detection portion for detecting defects, a training mode for training an anomaly detector portion to detect anomalous images that are not acceptable for defect detection processes, etc.)

The video tool portion 143 also includes Z-height measurement tools portion 143z, which provides various operations and features related to Z-height measurement operations. In one implementation, the Z-height measurement tools portion 143z may include Z-height tools 143zt. The Z-height tools 143zt may include an autofocus tool 143af, and a multipoint autofocus tool 143maf, for example. The Z-height tools 143zt may govern certain aspects of image stack acquisition and related structured light pattern generation operations in conjunction with the Z-height tools that are configured in a mode that determines best focus heights and/or Z-height measurements. In general, the Z-height measurement tools portion 143z may perform at least some operations similarly to known Z-height measurement tools, for example, performing operations in a learn mode and/or run mode or other mode, for generating all or part of a focus curve, and finding its peak as a best focus position. For example, certain known operations for Z-height measurement tools are described in U.S. Pat. No. 10,520,301, which is hereby incorporated herein by reference in its entirety.

The defect detection portion 140dp performs various defect detection operations, as will be described in more detail below. Prior to performing such defect detection operations, the defect detection portion 140dp is trained using a set of training images captured using specific (e.g., current) imaging, lighting and workpiece conditions. These conditions may change (e.g., drift) significantly when the defect detection portion 140dp is subsequently used over time for defect detection in an on-line or off-line environment. If the appearance of the images used during defect detection is substantially different from the appearance of the images in the set of training images, the performance of the trained defect detection portion 140dp may deteriorate. Accordingly, the defect detection portion 140dp may include a monitoring (e.g., anomaly detection) system that may be created/defined (e.g., at the time of the training of the defect detection portion 140dp, using some or all of the set of training images) and is capable of distinguishing normal (e.g., acceptable) and anomalous (e.g., unacceptable) input images and alerting a user if the appearance of the input images during defect detection is no longer satisfactory and can negatively affect the accuracy of the trained defect detection portion 140dp, effectively increasing the reliability of defect detection by the defect detection portion 140dp. In regard to the classification of images, the terms "normal" and "non-anomalous" are generally considered to have the same meaning and are used interchangeably herein.

In various exemplary implementations, the defect detection portion 140dp may implement a defect detection process that is performed along with a metrology process. In various implementations, it may be desirable to include the defect detection portion 140dp in a machine vision inspection system similar to the machine vision inspection system 100 of FIG. 1, which is configured to perform a metrology process, because the system can generate image data that are input to the defect detection process implemented by the defect detection portion 140dp. Accordingly, a single machine is configured to perform both a metrology process and a defect detection process, which can provide advantages over conventional metrology systems. For example, if a defect is detected in a workpiece while the defect detection process is performed, there may be no reason to perform the metrology process on the workpiece, which can save time. More specifically, if a defect is detected in a workpiece while the defect detection process is performed, it may not be necessary to measure a clearly defective part. Thus, it may be advantageous to perform the defect detection process prior to starting the metrology process.

Also, some defects might warrant further metrology or inspection to determine additional defect parameters. For example, a 2D image could enable a likely defect to be quickly recognized and enable an XY position of the defect and an approximate XY area of the defect to be quickly ascertained. If the 3D nature of a potential defect is important, the defect detection portion 140dp may cause additional processing (e.g., metrology operations) to be performed to determine whether the potential defect is an actual defect. For example, if a scratch in a surface of a workpiece must be deeper than a particular threshold value to be considered a defect, the defect detection portion 140dp could cause a more time consuming 3D point cloud of the affected region to be acquired (e.g., utilizing a z-height measurement tools portion 143z), to learn if the depth of the scratch is sufficient to cause the part to be rejected. In various implementations, different actions may be performed (e.g., as may be programmed to automatically occur) as a result of an initial defect classification, such as (1) continue with a standard metrology process, (2) stop or pause the defect detection process and perform a metrology process that includes more informative measures of the potential defect (e.g., 3D, different lighting, touch probe measurements such as surface roughness, etc.), (3) send the workpiece to scrap (e.g., discard or recycle workpiece), (4) send the workpiece for additional human inspection, (5) provide feedback to a production line that indicates something may be wrong with the machinery or process, etc.

In various exemplary implementations, the defect detection portion 140dp of the memory 140 stores model data and program instructions for various tools and algorithms of a defect detection system that can be used to infer whether various types of defects are present in an image of a workpiece (i.e., as indicating a defect on a portion of the workpiece surface that is included in the image). While the machine vision inspection system is operated in a training or learning mode, the defect detection system uses a set of training images including defect and non-defect images for training the defect detection portion 140dp. The set of training images is captured using specific (e.g., current) imaging, lighting, and workpiece conditions. After the defect detection portion 140dp is initially trained, the defect detection portion 140dp is operated in a run mode to infer whether a defect is included in new, previously unseen workpiece images, and to correspondingly classify the each workpiece image as defect or non-defect.

As will be described in more detail below, FIGS. 3A-3F, 4A-4E and 5A-5D show examples of some workpiece images that may be acquired by the machine vision inspection system 100 and may in some implementations be utilized to train the defect detection portion 140dp during a training mode (and/or some of the images may be examples of workpiece images that are later acquired by the machine vision inspection system 100 during a run mode and may be analyzed by the trained defect detection portion 140dp). In particular, the example workpiece images of FIGS. 3A-3F and 4A-4E are of different sections (i.e., at different XY locations) on machined aluminum plates, and for which FIGS. 3A-3F show examples of non-defect images and FIGS. 4A-4E show examples of defect images (e.g., for which a set of training images will typically include a number of both defect and non-defect workpiece images), as will be described in more detail below. The differences between the images help illustrate in part why it may be desirable to utilize a number of training images for training the defect detection portion 140dp. More specifically, due in part to different possible characteristics of different workpiece images that may be acquired for inspecting a type of workpiece (e.g., as illustrated by the differences between the workpiece images FIGS. 3A-3F and 4A-4E for inspecting a type of machined aluminum plate), the accuracy of the defect detection portion 140dp for detecting defects may be improved by utilizing a variety of workpiece images for the training that may be similar to a variety of images that may later be acquired during a run mode and/or that may otherwise better enable detection of defects in such images. For example, in specific regard to the examples of FIGS. 3A-3F, 4A-4E and 5A-5D, such training may help the defect detection portion 140dp distinguish between the defects (e.g., which in the illustrated examples may include a variety of different types of scratch defects, etc.) and the features of normal workpiece surfaces (e.g., which in the illustrated examples may include a variety of different types of machining marks formed on the plate surfaces which appear as a hashed texture that varies across the surface, etc.)

While the defect detection portion 140dp is operated in the run mode, over time the imaging, lighting, and workpiece conditions used in the machine vision inspection system may change (e.g., drift, etc.) significantly, for example, due to the aging of one or more the light sources that illuminate the workpiece when image data are obtained, accumulation of dust (e.g., on lenses), optical misalignments, changing manufacturing conditions, and other random or systematic factors. As a result, the images input to the defect detection portion 140dp during the run mode analysis may become substantially different from the images used to train the defect detection portion 140dp, which may cause considerably poorer defect detection performance. For example, more false positives may be caused by the changed imaging conditions on non-defect images being interpreted as defects by the defect detection portion 140dp. As another example, the defect detection portion 140dp may have difficulty detecting or otherwise distinguishing the actual defects relative to the normal workpiece surface features (e.g., machining marks, etc.) due to the changed image conditions.

Accordingly, the defect detection portion 140dp includes an image data monitor and anomaly detector subsystem that creates a generalized model of a set of training images (e.g., including defect and non-defect images, and which may include all or some of the available training images) and stores the generalized model with the defect detection portion 140dp to be subsequently used in monitoring the quality of images during defect detection. As will be described in more detail below, in various implementations the determination of the generalized model may include determining training image features from the training images and determining anomaly detector classification characteristics based on the training image features. In accordance with the use of the model, if the appearance/quality of the images used for defect detection deviates too far from that of the images used to train the defect detection portion 140dp (e.g., for which the images may be classified as anomalous), a designed action may be performed (e.g., a user can be alerted and/or the system can be adjusted, etc.) For example, the user or the system can either adjust an imaging condition, a lighting condition, and/or a workpiece condition, or retrain the defect detection portion 140dp to compensate for the deviations and to maintain good performance of the defect detection system.

It will be appreciated that the potential variety of training images as described above (and as illustrated by the variety of examples of FIGS. 3A-3F, 4A-4E and 5A-5D) helps illustrate the importance of utilizing the set of training images for determining the generalized model. More specifically, since the training images may have varying characteristics, in accordance with principles disclosed herein, it is beneficial to determine an accurate representation of the differences (e.g., as corresponding to ranges or other measures of the different training image features and associated anomaly detector classification characteristics), which helps ensure the accuracy of the anomaly detection process for classifying certain images as anomalous (e.g., with characteristics that have deviated beyond certain acceptable ranges, threshold values, etc. of characteristics as determined from the training images, etc.)

As noted above, FIGS. 3A-3F and 4A-4F are examples of workpiece images of sections of workpieces which are relatively "flat" machined aluminum plates. Each image is taken from a same angular view point (e.g., directly overhead at a 90 degree angle to the plate) but each at a different XY location on a plate. Each image shows a view that is about 2.5 millimeters by 1.9 millimeters (XY) of a surface of the plates. Accordingly, each image shows a magnified view of a portion of a surface of a plate. Machining marks formed on a plate surface create a hashed texture that normally varies across the surface. In the images, at such a magnified scale, the relatively flat plate may not appear to be flat. In the current example, the height of some of the hashed machining mark ridges may be approximately 5 micrometers or less.

Figure 4A:
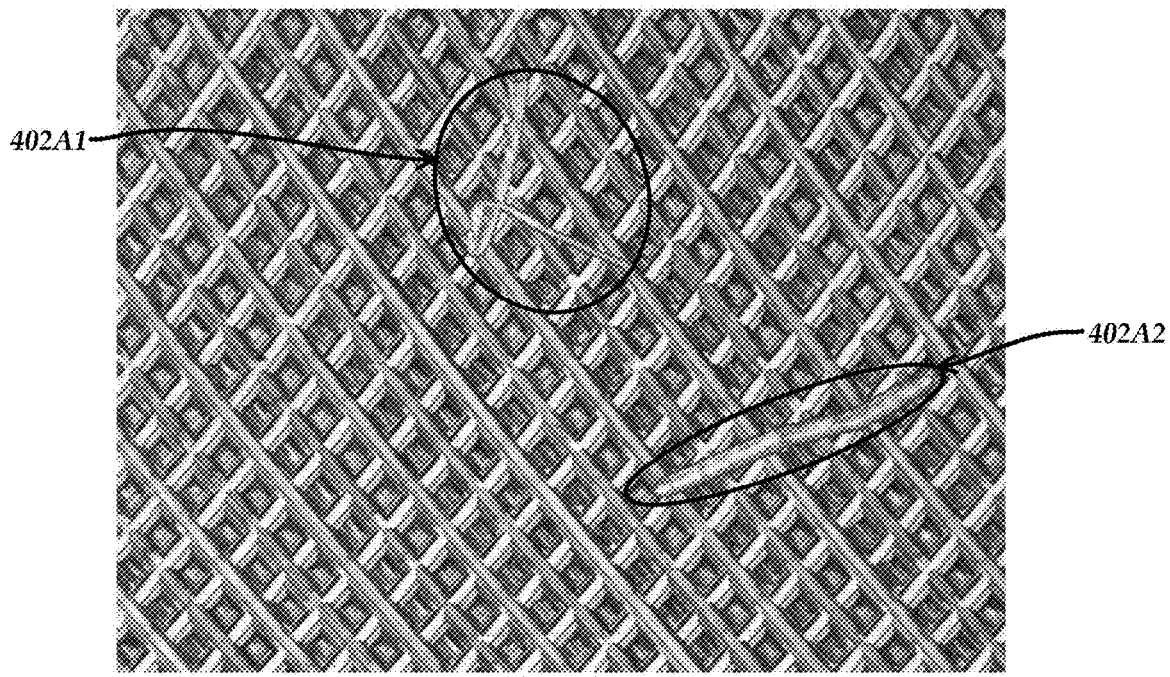
FIGS. 4A-4E are examples of images of portions of workpieces that include defects, as may be acquired using a machine vision inspection system similar to that of FIG. 1.
Figure 4B:
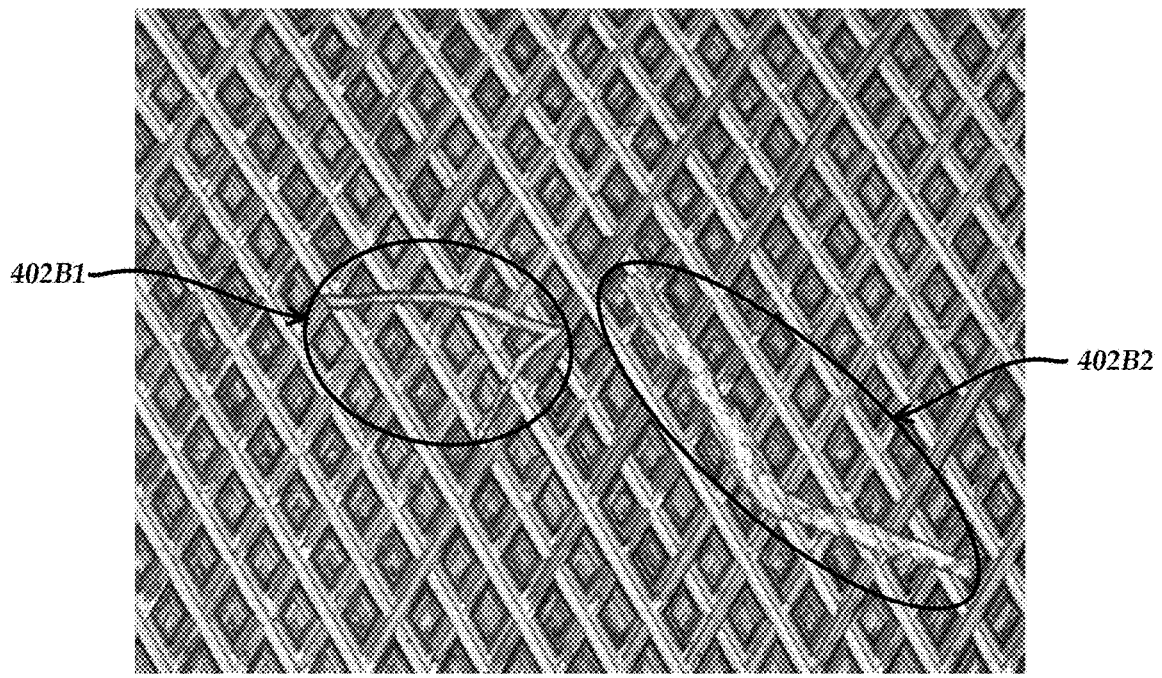
Figure 4C:
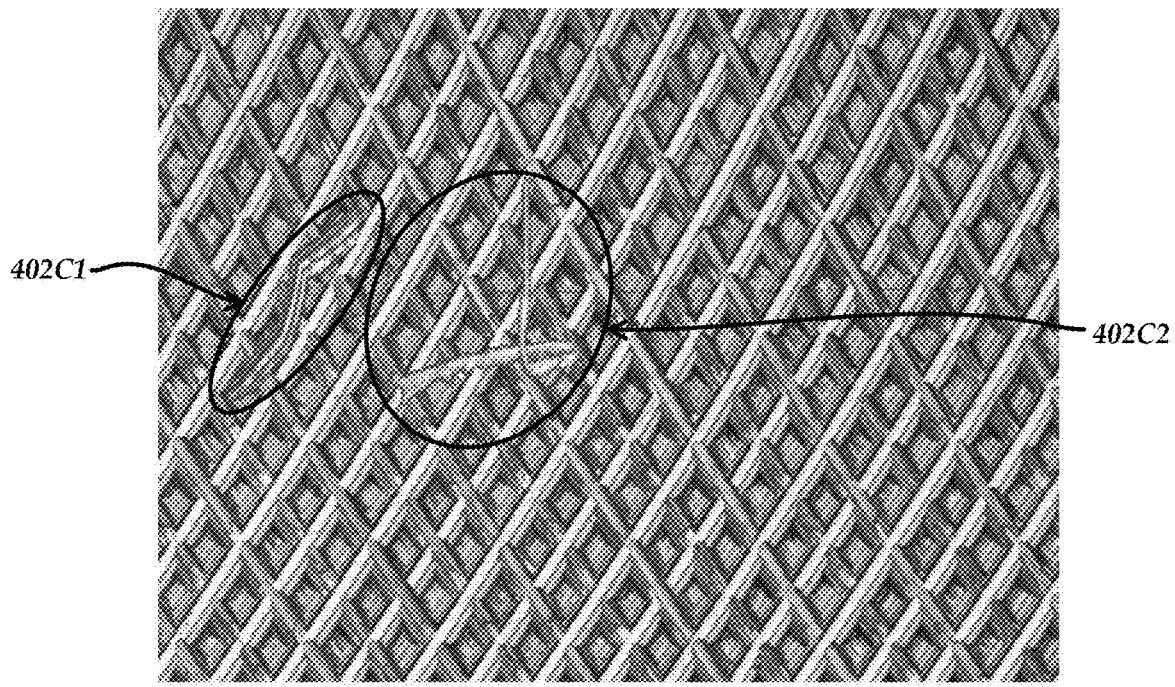
Figure 4D:
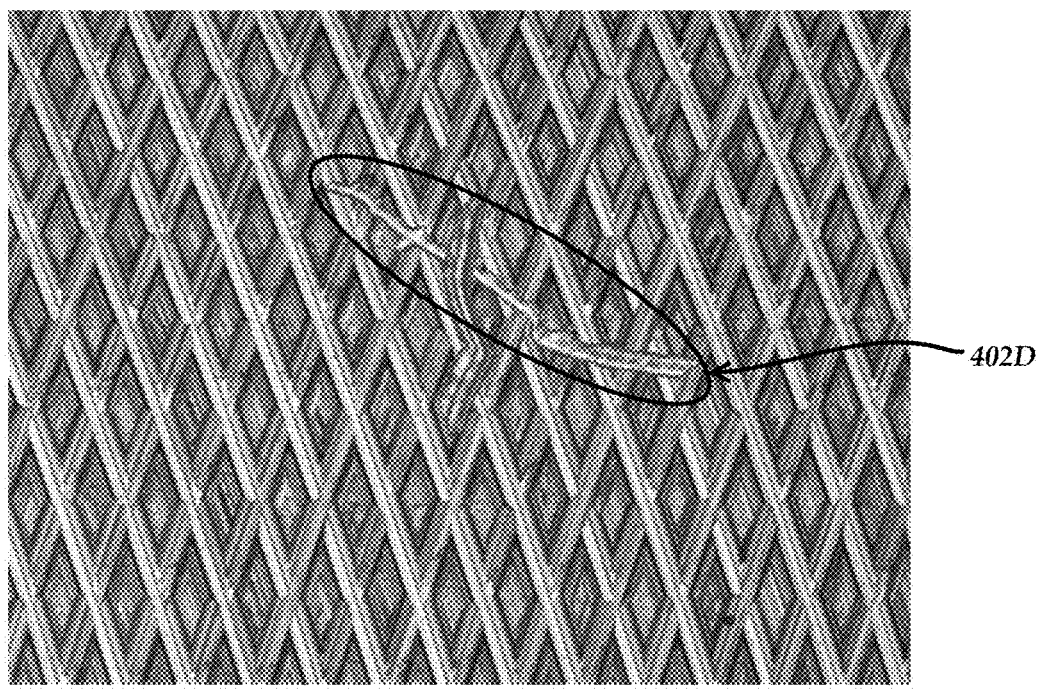
Figure 4E:
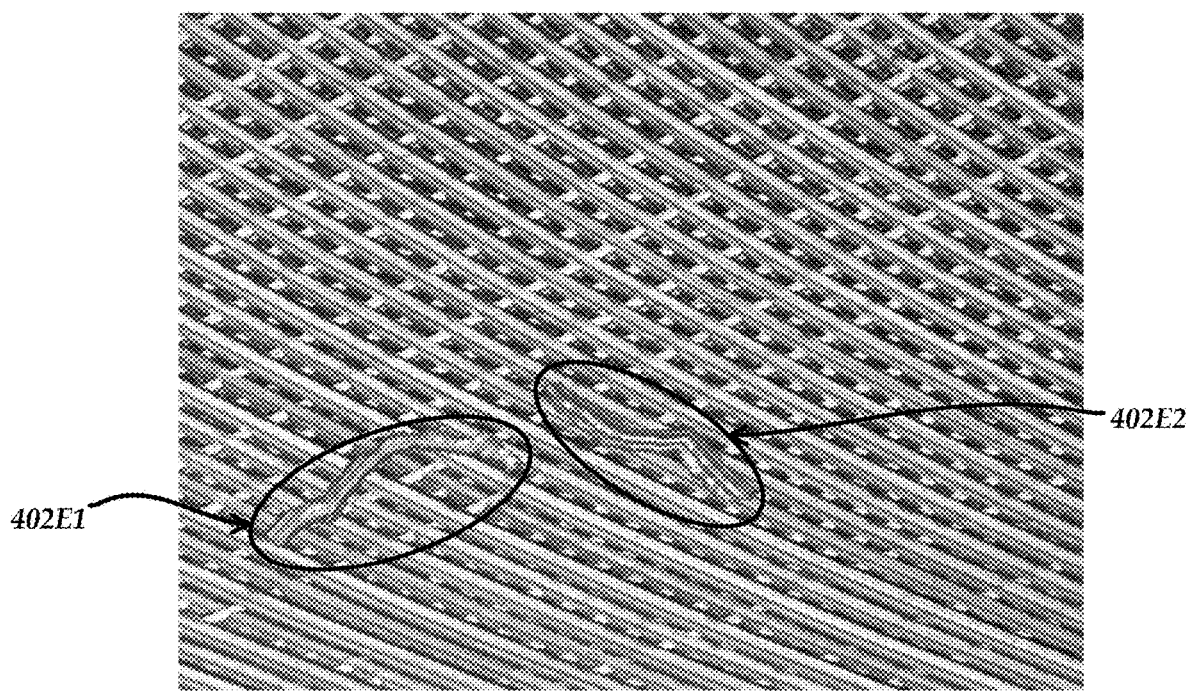

The sections of the machined aluminum plates shown in FIGS. 3A-3F do not include defects. In other words, FIGS. 3A-3F show examples of images of sections of the machined aluminum plate that are "non-defect". In contrast, FIGS. 4A-4E show examples of images of sections of workpieces that include defects. The images shown in FIGS. 4A-4E are similar to those shown in FIGS. 3A-3F, except that the images of FIGS. 4A-4E include defects 402 that are formed on surfaces of machined aluminum plates. The defects 402 in these examples are scratches formed in the surfaces of the machined aluminum plates. More specifically, FIG. 4A illustrates scratch defects 402A1 and 402A2, FIG. 4B illustrates scratch defects 402B1 and 402B2, FIG. 4C illustrates scratch defects 402C1 and 402C2, FIG. 4D illustrates a scratch defect 402D, and FIG. 4E illustrates scratch defects 402E1 and 402E2. As noted above, the variety of characteristics of the defects and workpiece surfaces illustrated in FIGS. 3A-3F and 4A-4E helps illustrate in part why it may be desirable to utilize a number of training images for training the defect detection portion 140dp (e.g., for which the set of training images will typically include a number of defect and non-defect workpiece images), and correspondingly why it may be desirable to utilize the variety of training images for determining the training image features and associated anomaly detector classification characteristics which help improve the accuracy of the anomaly detection process.

Figure 5A:
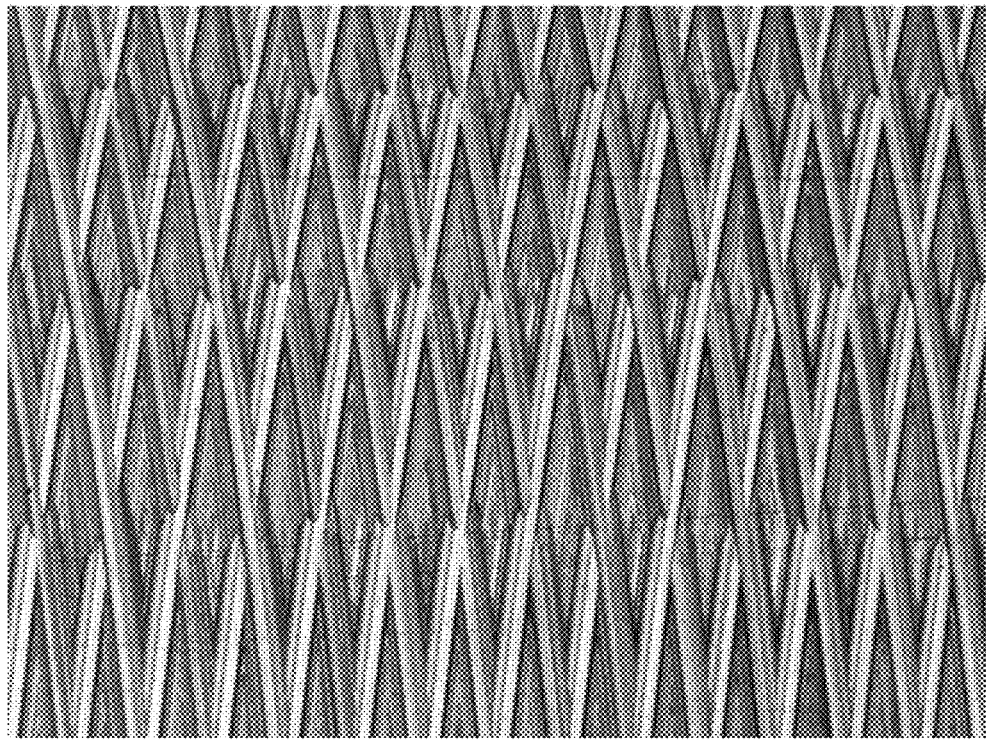
FIGS. 5A-5D are examples of images of similar portions of workpieces, with and without defects, as may be acquired using a machine vision inspection system similar to that of FIG. 1.
Figure 5B:
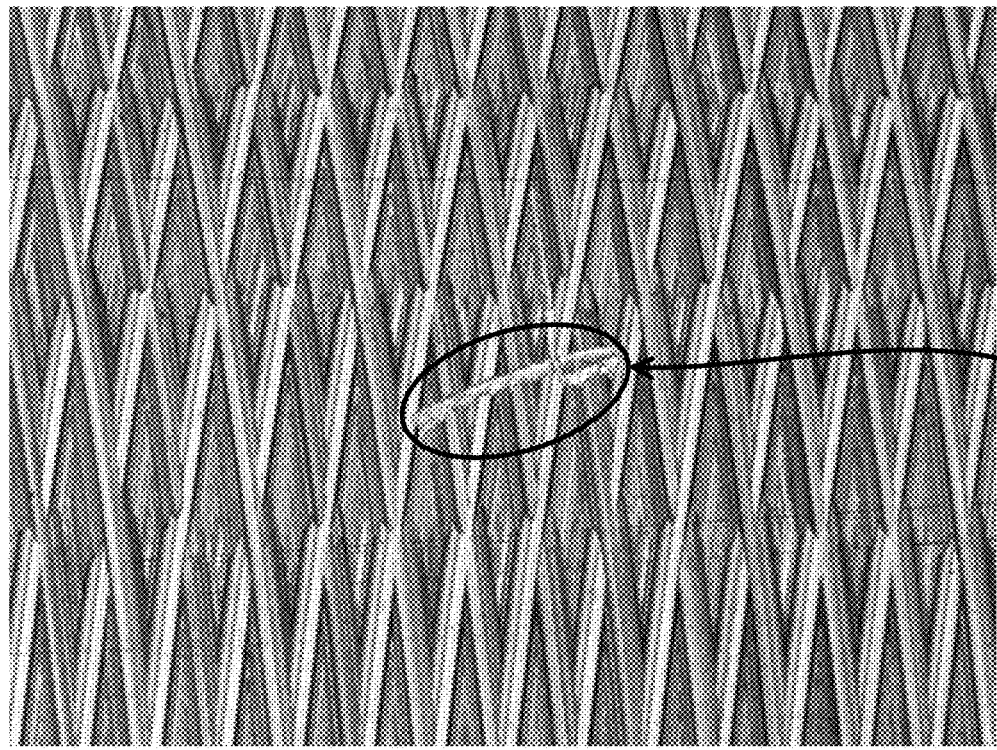
Figure 5C:
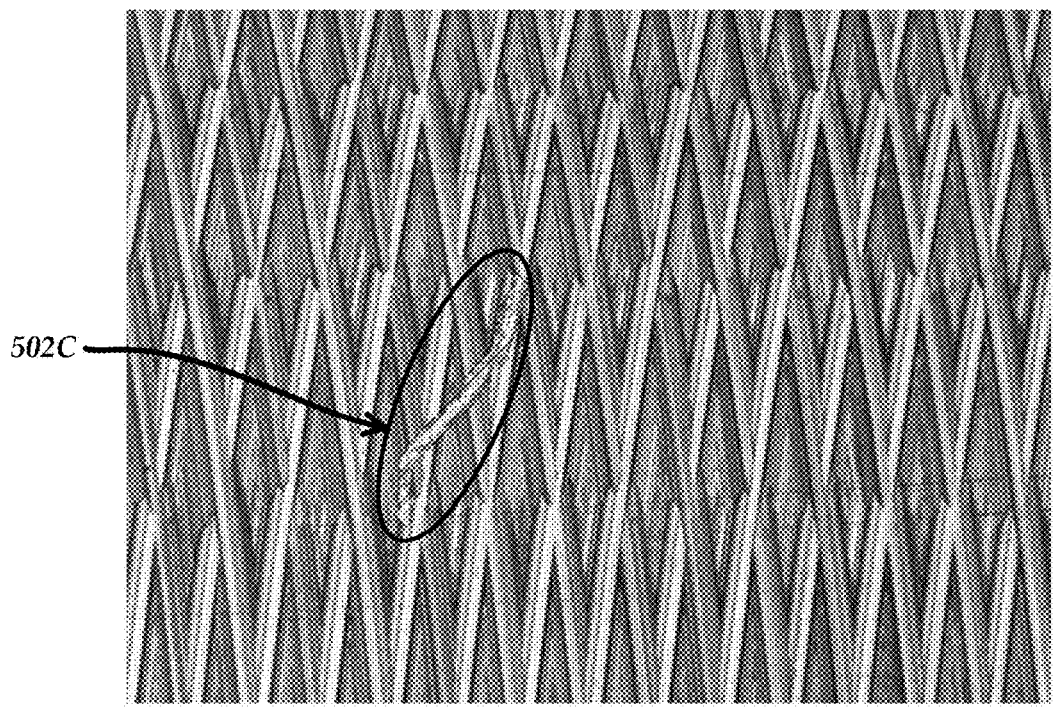
Figure 5D:
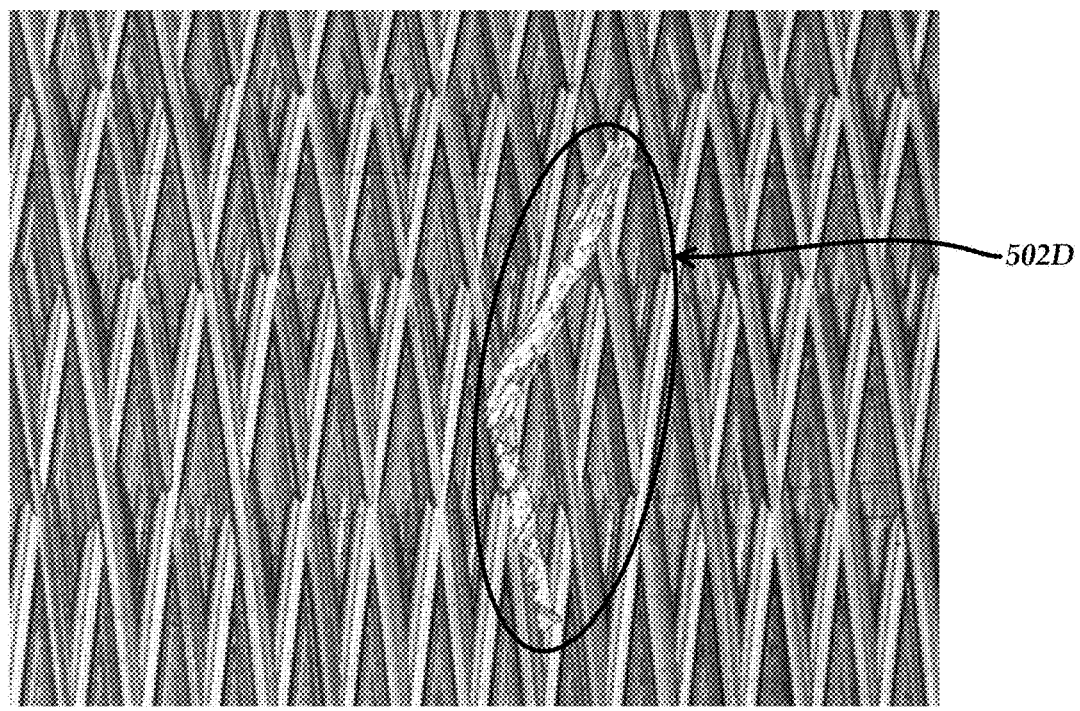

FIGS. 5A-5D are examples of images of similar portions of workpieces, with and without defects, as may be acquired using a machine vision inspection system similar to that of FIG. 1. FIG. 5A shows an example section of the plate that may be classified as "non-defect". FIGS. 5B-5D show examples of images of sections of the plate that may be classified as "defect", wherein each of the images includes a scratch defect 502 (e.g., including the respective scratch defects 502B, 502C and 502D). In the examples of FIGS. 5A-5D, the images are of similar portions of workpieces (e.g., for which the types of machining marks formed on the surfaces of the portions are similar or nominally the same in each image and the primary difference between the images is the characteristics of the respective scratch defects 502B, 502C and 502D). In one example implementation, the images of FIGS. 5A-5C may be included as part of a training set of images for training the defect detection portion 140dp. The image of FIG. 5D may be an example of a run mode image which may be analyzed by the defect detection portion 140dp to determine if it should be classified as a defect image or a non-defect image. In various implementations, the defect detection portion 140dp may have been well trained for being able to properly classify the image of FIG. 5D as a defect image (e.g., as having been trained by the training images of FIGS. 5A-5C including the similar portions of workpieces and scratch defects 502B and 502C having certain similar characteristics as the scratch defect 502D). In various implementations, certain additional processes may be performed with respect to the example scratch defect 502D. For example, one or more metrology processes may be performed in conjunction with the defect detection process, for which various dimensions or other characteristics of the example scratch defect 502D may be determined, as will be described in more detail below with respect to FIG. 6. As will also be described in more detail below with respect to FIGS. 7A-7J and 8A-8F, anomalous variations may occur in various run mode images (e.g., which in the particular examples may be similar and compared to the images of FIGS. 5A and 5D).

Figure 6:
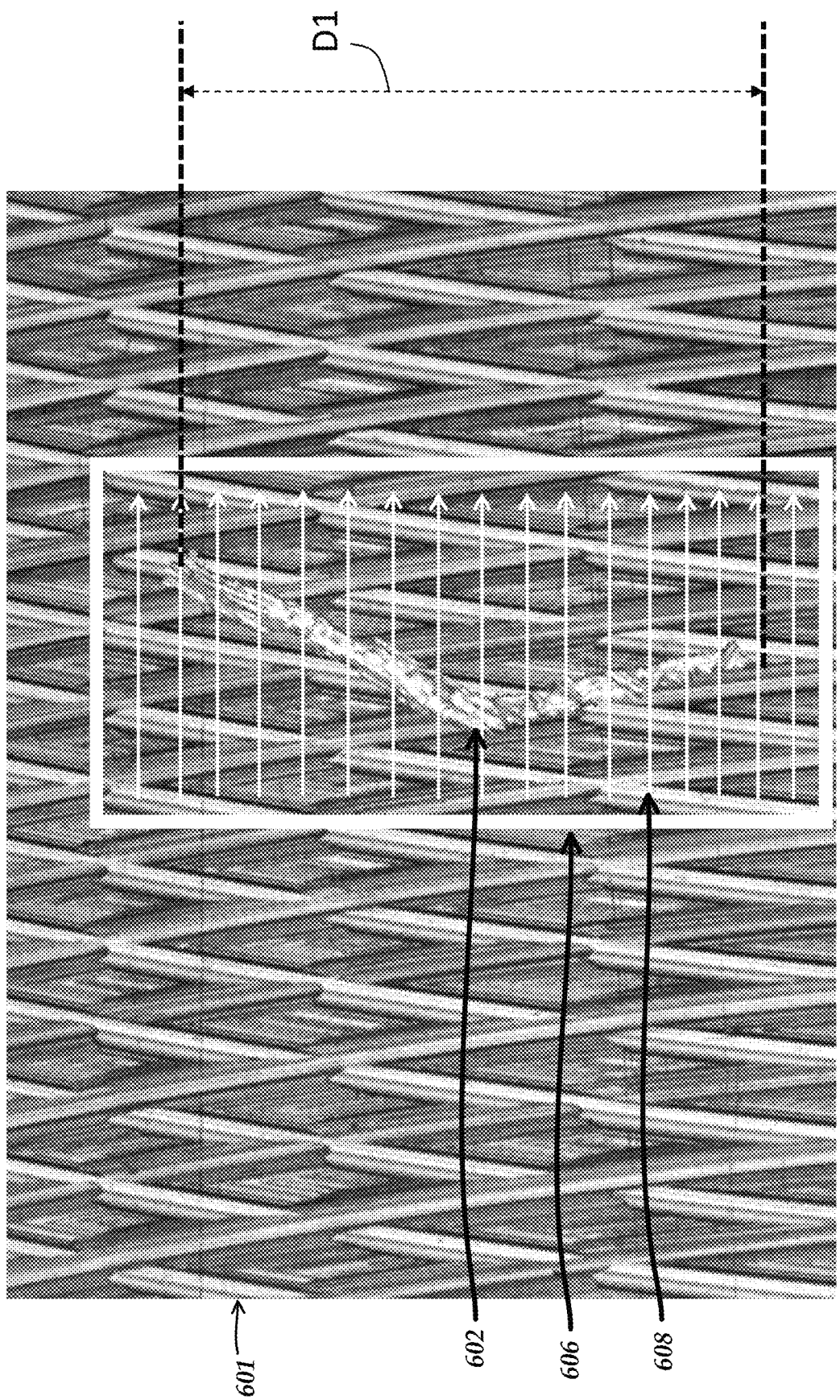
FIG. 6 is a diagram illustrating utilization of one or more video tools for performing metrology operations on an image of a workpiece that includes a defect.

FIG. 6 is a diagram illustrating utilization of one or more video tools for performing metrology operations on an image of a workpiece that includes a defect (e.g., for determining dimensions of the defect, etc.) As illustrated, for an image 601 (e.g., which may be similar or the same as the image of FIG. 5D) that includes a scratch defect 602 (e.g., which may be similar or the same as the scratch defect 502D), a video box tool 606 includes scan lines 608 (e.g., which may also or alternatively be representative of video point tools, etc.) which are utilized for determining the edge locations, dimensions, and/or other aspects of the scratch defect 602. In various exemplary implementations, the video box tool 606 may be sized, positioned and rotated, until the box tool 606 is indicative of, or defines, the region of interest (e.g., the area within the box tool 606), and the arrows shown in FIG. 6 (e.g., representative of scan lines, point tools, etc.) may be utilized to determine the edge(s) of the scratch defect 602. In various exemplary embodiments, the video box tool 606 may generally use one or more conventional edge gradient(s) along the edge(s) of the defect 602 in the region of interest, and the edge(s) of the defect 602 may be determined based on the local magnitudes of the edge gradient(s) along the various scan lines 608, etc.

In various exemplary implementations, such metrology operations may also include performing certain morphological filtering or other filtering (e.g., to distinguish the edges of the scratch from the machined pattern of the workpiece, for which certain types of such filtering are described in U.S. Pat. No. 7,522,763, which is hereby incorporated herein by reference in its entirety). As shown in FIG. 6, in the display area included in the image, the box tool 606 with the scan lines 608 is utilized to determine the edge locations (e.g., the outer edges or perimeter) of the scratch defect 602. Based on such determinations, the video tool and/or other metrology operations may include determining a dimension D1 of the scratch defect (e.g., corresponding to a length or other dimension of the scratch defect 602). In various exemplary implementations, the box tool 606, scan lines 608 and/or other video tools and/or metrology operations may be utilized to determine other dimensions of the scratch defect 602 (e.g., width, depth, etc.) For example, as described above, the video tool portion 143 may include a Z-height measurement tools portion 143z, for which a corresponding video tool or operations may be utilized for determining the Z-height dimensions of the scratch defect (e.g., including determining the depth of the scratch relative to other portions or features of the workpiece surface, etc.)

As part of the general operations of the defect detection portion, some defects that are detected may warrant further metrology or inspection to determine additional defect parameters. For example, as noted above, various types of analysis and/or processing of the defect image that includes the scratch defect 602 may enable determination of the XY position and approximate XY area and/or other dimensions of the defect 602 (e.g., utilizing video tools and/or other operations as described above). If the 3D nature of the potential defect is important (e.g., if a scratch must be deeper than some value to be considered a defect), then the defect detection portion 140dp may initiate a process for utilizing a Z-height measurement tool (e.g., of the Z-height measurement tools portion 143z) or other 3D sensing process (e.g., for acquiring a 3D point cloud of the affected region to determine the depth of the scratch, etc.).

As will be described in more detail below, FIGS. 7A-7J are examples of images of similar portions of workpieces, with and without defects (e.g., similar to FIGS. 5A and 5D), and with varying levels of brightness, as may be acquired by a machine vision inspection system similar to that of FIG. 1. In regard to varying levels of brightness, in various exemplary implementations, as described above the set of training images may be analyzed to determine training image features (e.g., in relation to brightness and/or other features), and corresponding anomaly detector classification characteristics may be determined based on the training image features. In accordance with such determinations, in one specific example implementation the machine vision inspection system 100 may be determined in relation to the training images to be able to provide robust accuracy performance out to about ±15% of a baseline brightness of the stage light source 220, coaxial light source 230, and/or surface light source 240 used to illuminate the workpiece 20. Over time as the stage light source 220, coaxial light source 230, and surface light source 240 are used, the brightness of each may degrade. Additionally or alternatively, the brightness of the stage light source 220, coaxial light source 230, and surface light source 240 may inadvertently be set to a value significantly different from that used to acquire training images, resulting in poor image defect detection accuracy performance. Additionally or alternatively, the camera aperture or other light transmission optical elements (e.g., lenses, mirrors, filters, etc.) could change from their condition or setting used to acquire training images, resulting in more or less light reaching the camera imager. Additionally or alternatively, the ambient room light could change from its intensity when training images were acquired, resulting in more or less light reaching the camera imager. Accordingly, it may be desirable to inspect image data generated by the machine vision inspection system 100 in order to determine whether the brightness of the images being inspected are more than ±15% of the baseline brightness (e.g., for which the ±15% of the baseline brightness may represent anomaly detector classification characteristics), and perform a designated action if the brightness is outside of a range that results in robust defect detection accuracy performance (e.g., to warn a user that there is a problem with a lighting condition of the workpiece 20 and/or to adjust one or more of the light settings, etc.)

Thus, the defect detection portion 140dp may include an image data monitor and anomaly detector subsystem that can process image data corresponding to an image of a workpiece and detect whether the image data were generated with a brightness that is outside of the range (e.g., ±15% of the baseline brightness) that results in robust accuracy performance. After the image data monitor and anomaly detector subsystem has been trained using a set of training images, the image data monitor and anomaly detector subsystem can detect whether operational image data is generated with a brightness that is outside of the range that results in robust accuracy performance.

FIGS. 7A-7J are examples of images of similar portions of workpieces, with and without defects, and with varying levels of brightness, as may be acquired by a machine vision inspection system similar to that of FIG. 1, such as during a run mode and/or as may be utilized as training images. In the examples of FIGS. 7A-7J, the images are of similar portions of workpieces (e.g., for which the types of machining marks formed on the surfaces of the portions are similar or nominally the same in each image and the primary difference between the images is the levels of brightness). The images of FIGS. 7A-7E are non-defect images (e.g., as may be compared to the image of FIG. 5A) and the images of FIGS. 7F-7J are defect images (e.g., as may be compared to FIG. 5D and as including respective defects 702F-702J similar to defect 502D).

In one example implementation, the image data monitor and anomaly detector subsystem may be trained to classify image data as "normal" or "non-anomalous" if the image data indicates a brightness (e.g., average brightness) that is ±15% of a baseline brightness, and to classify the image data as "abnormal" or "anomalous" if the image data indicates a brightness that is not ±15% of the baseline brightness. For example, if the image data monitor and anomaly detector subsystem determines that image data indicates a brightness that is ±25% of the baseline brightness, the image data monitor and anomaly detector subsystem may classify the image data as "abnormal" or "anomalous".

Figure 7A:
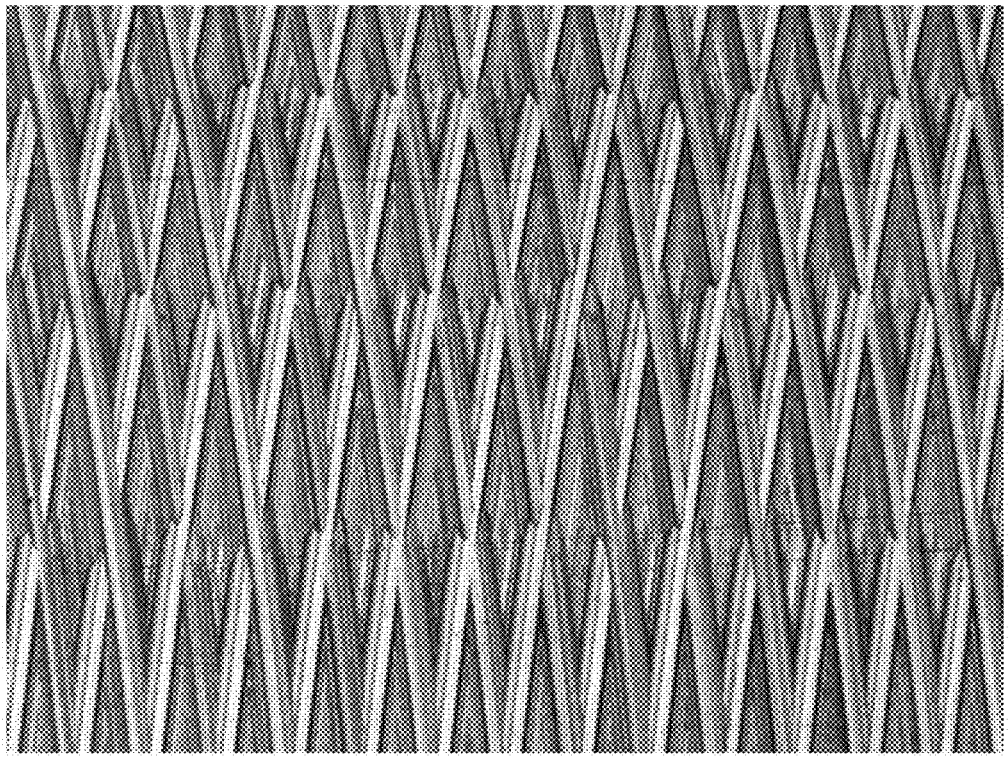
FIGS. 7A-7J are examples of images of similar portions of workpieces, with and without defects, and with varying levels of brightness, as may be acquired by a machine vision inspection system similar to that of FIG. 1.

FIG. 7A is a non-defect image of a workpiece having a baseline brightness. In accordance with the present example, the image data monitor and anomaly detector subsystem may classify image data corresponding to the image of FIG. 7A as "normal" or "non-anomalous".

Figure 7B:
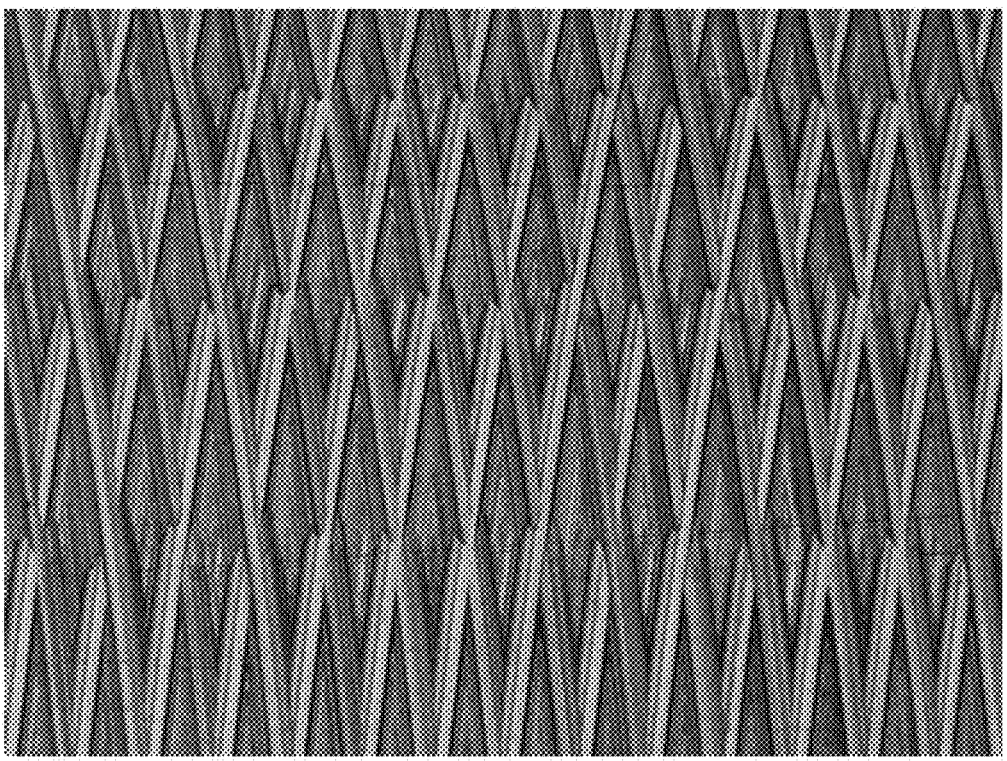

FIG. 7B is a non-defect image of the workpiece having a brightness that is 25% less than the baseline brightness. In accordance with the present example, the image data monitor and anomaly detector subsystem may classify image data corresponding to the image of FIG. 7B as "abnormal" or "anomalous".

Figure 7C:
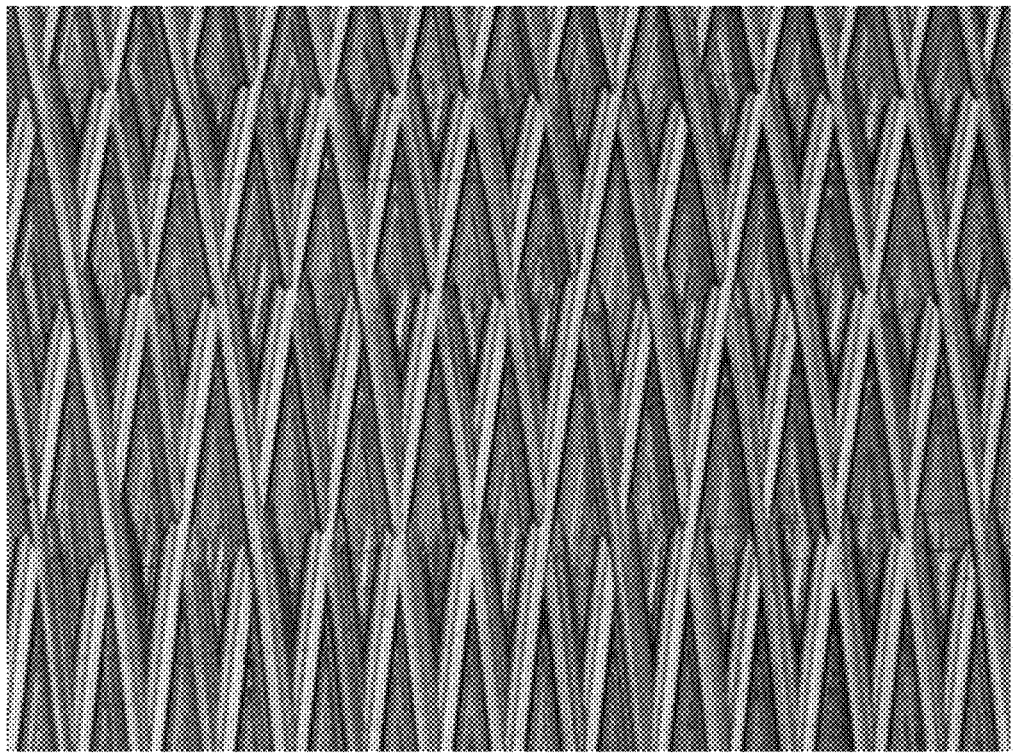

FIG. 7C is a non-defect image of the workpiece having a brightness that is 15% less than the baseline brightness. In accordance with the present example, the image data monitor and anomaly detector subsystem may classify image data corresponding to the image of FIG. 7C as "normal" or "non-anomalous".

Figure 7D:
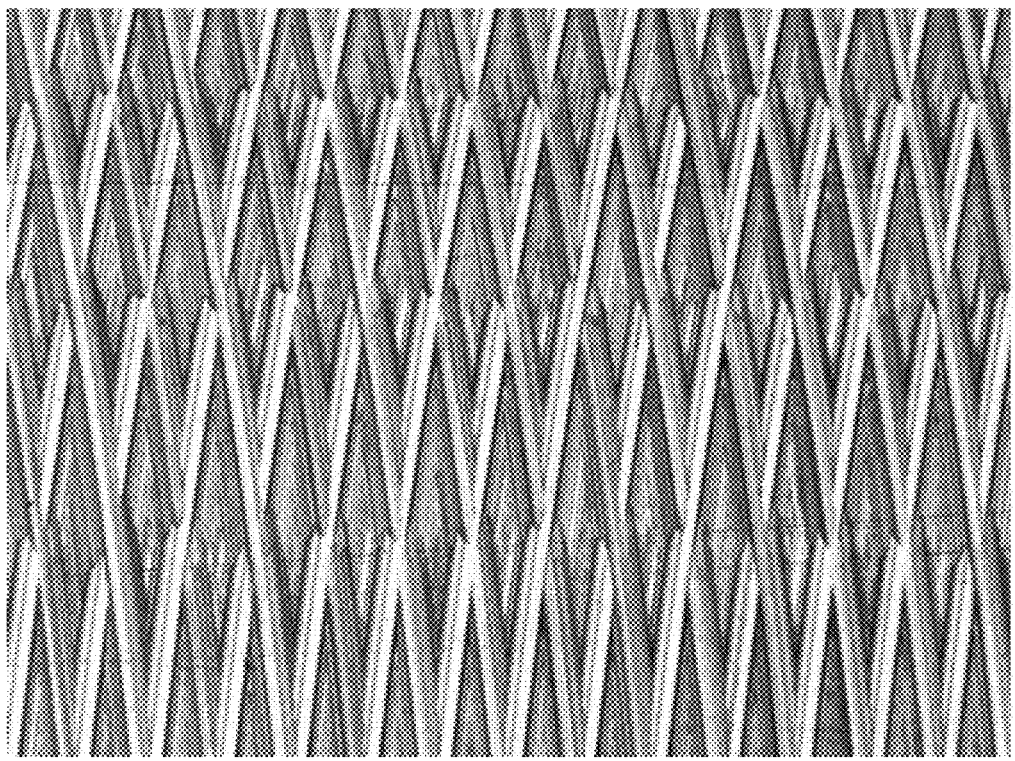

FIG. 7D is a non-defect image of the workpiece having a brightness that is 15% more than the baseline brightness. In accordance with the present example, the image data monitor and anomaly detector subsystem may classify image data corresponding to the image of FIG. 7D as "normal" or "non-anomalous".

Figure 7E:
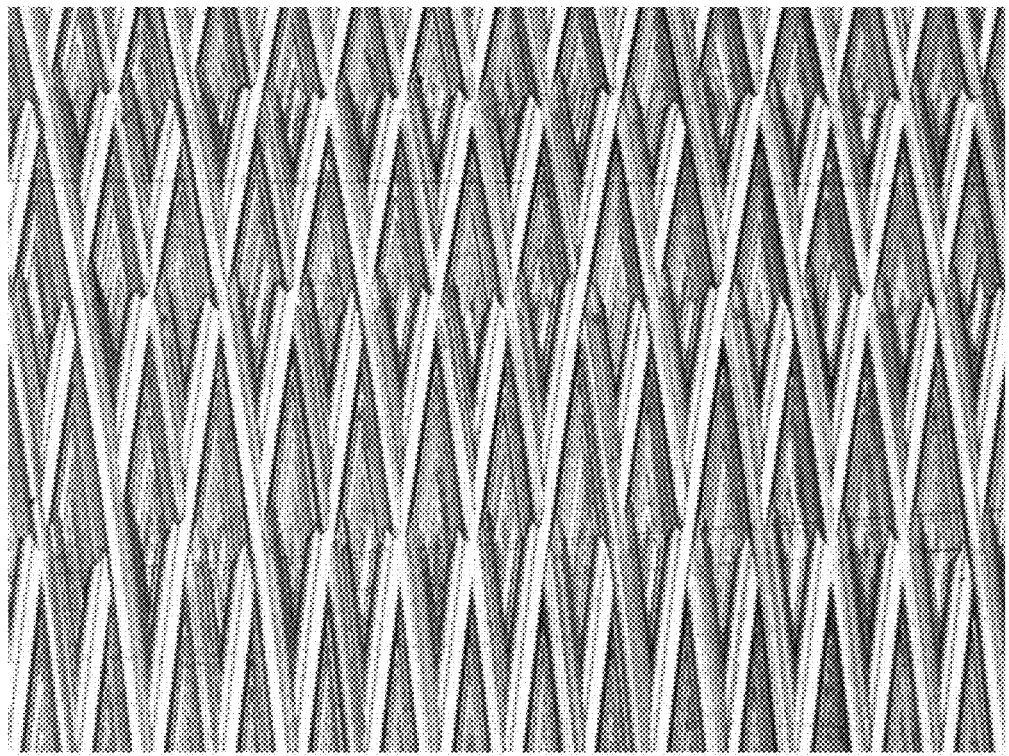

FIG. 7E is a non-defect image of the workpiece that is captured while the workpiece is illuminated using a brightness that is 25% more than the baseline brightness. In accordance with the present example, the image data monitor and anomaly detector subsystem may classify image data corresponding to the image of FIG. 7E as "abnormal" or "anomalous".

Figure 7F:
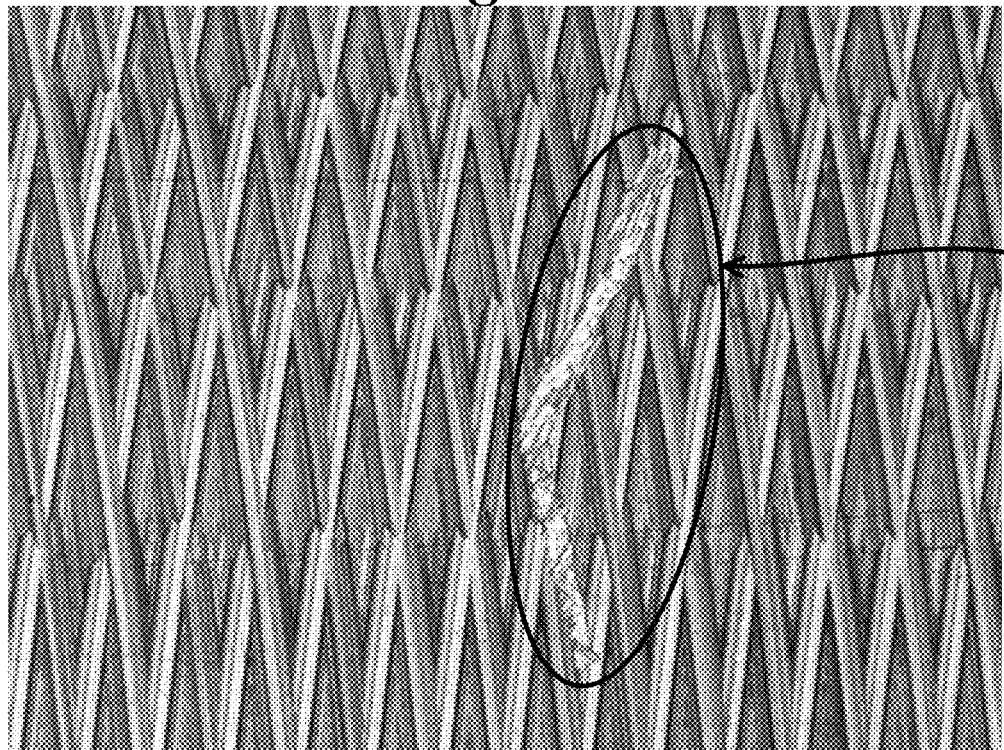

FIG. 7F is a defect image of the workpiece having the baseline brightness. In accordance with the present example, the image data monitor and anomaly detector subsystem may classify image data corresponding to the image of FIG. 7F as "normal" or "non-anomalous".

Figure 7G:
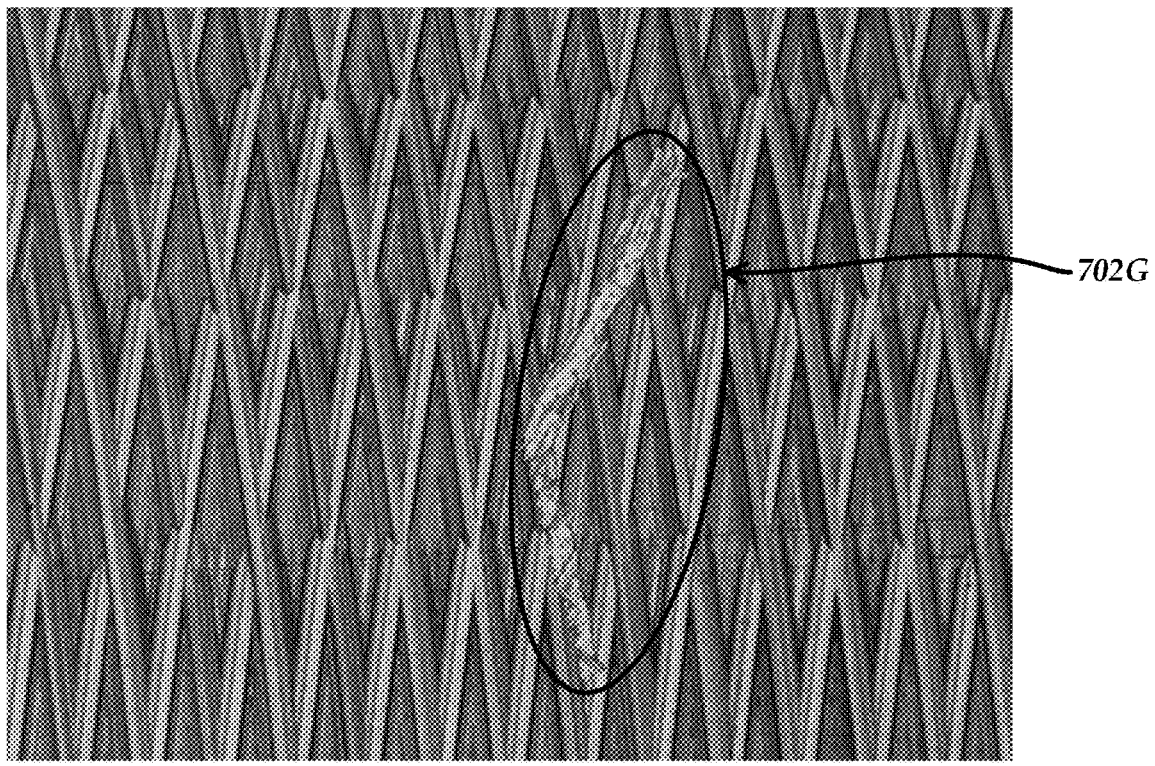

FIG. 7G is a defect image of the workpiece having a brightness that is 25% less than the baseline brightness. In accordance with the present example, the image data monitor and anomaly detector subsystem may classify image data corresponding to the image of FIG. 7G as "abnormal" or "anomalous".

Figure 7H:
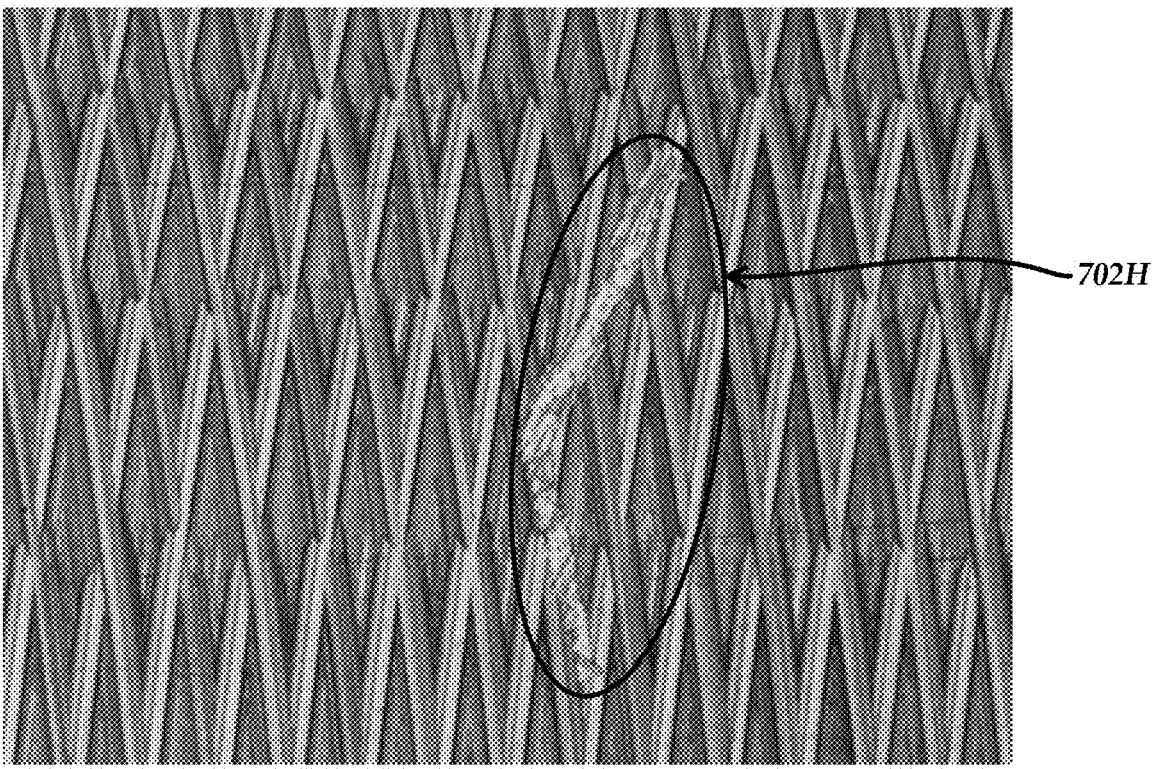

FIG. 7H is a defect image of the workpiece having a brightness that is 15% less than the baseline brightness. In accordance with the present example, the image data monitor and anomaly detector subsystem may classify image data corresponding to the image of FIG. 7H as "normal" or "non-anomalous".

Figure 7I:
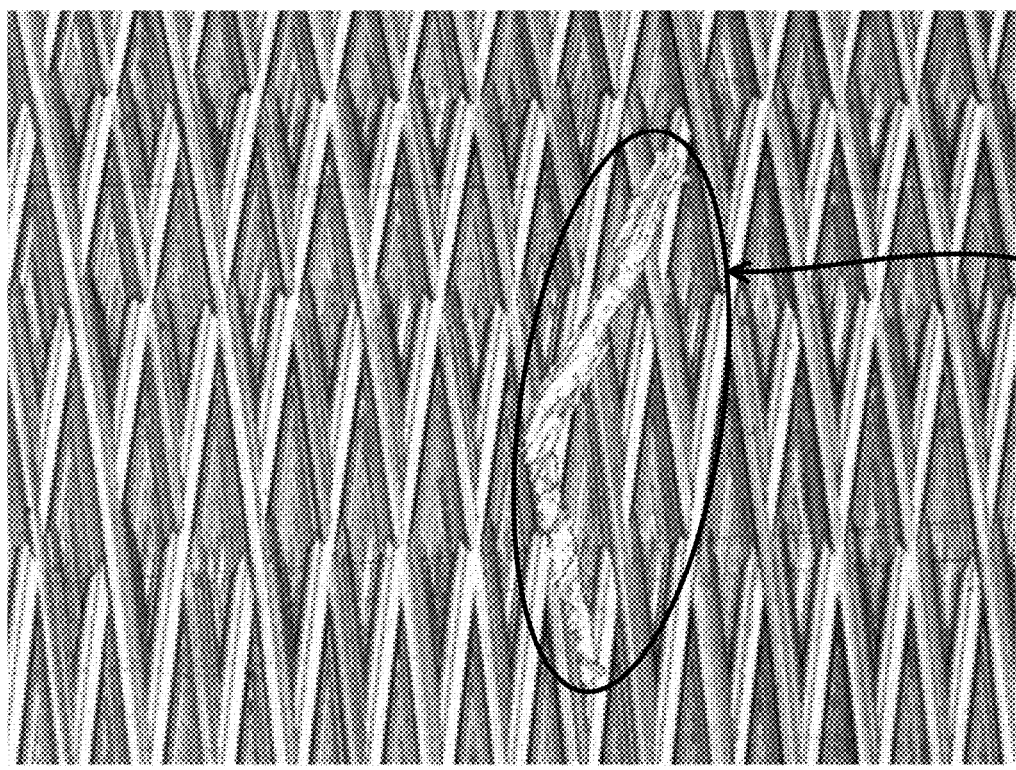

FIG. 7I is a defect image of the workpiece having a brightness that is 15% more than the baseline brightness. In accordance with the present example, the image data monitor and anomaly detector subsystem may classify image data corresponding to the image of FIG. 7I as "normal" or "non-anomalous".

Figure 7J:
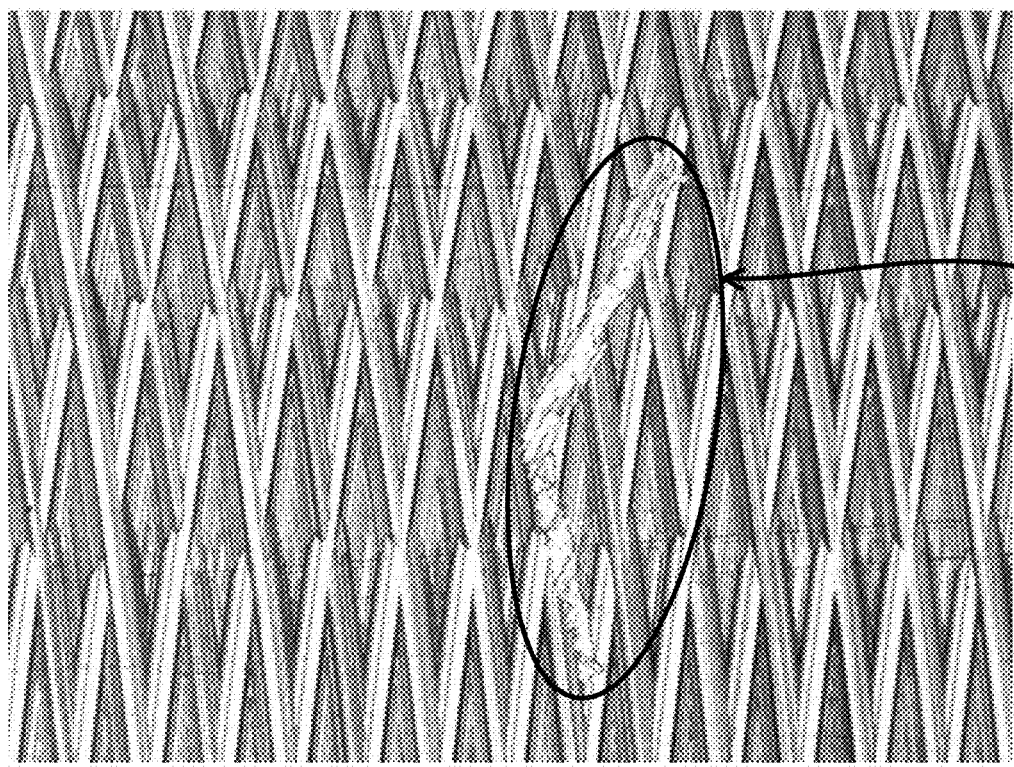

FIG. 7J is a defect image of the workpiece having a brightness that is 25% more than the baseline brightness. In accordance with the present example, the image data monitor and anomaly detector subsystem may classify image data corresponding to the image of FIG. 7J as "abnormal" or "anomalous".

It will be appreciated that while certain of the pairs of images illustrating the 15% and 25% brightness levels (e.g., the images of FIGS. 7B and 7C, and FIGS. 7D and 7E, and FIGS. 7G and 7H, and FIGS. 7I and 7J) may in some instances not appear significantly different to the human eye, such differences may be significant for the operations of the defect detection portion 140*dp*. For example, in certain implementations the 25% differences in brightness levels from the baseline brightness level may be determined to inhibit the ability of the defect detection portion 140*dp* to accurately distinguish between the defects (e.g., such as the defects 702G and 702J) and the features of normal workpiece surfaces (e.g., the other portions of the surfaces in the images of FIGS. 7G and 7J and/or with respect to determining if such defects exist within images such as those of FIGS. 7B and 7E).

As will be described in more detail below, FIGS. 8A-8F are examples of images of similar portions of workpieces, with and without defects (e.g., similar to FIGS. 5A and 5D), and with varying levels of focus, as may be acquired by a machine vision inspection system similar to that of FIG. 1. In regard to varying levels of focus, in various exemplary implementations, as described above the set of training images may be analyzed to determine training image features (e.g., in relation to focus and/or other features), and corresponding anomaly detector classification characteristics may be determined based on the training image features. In accordance with such determinations, in one specific example implementation, the machine vision inspection system 100 may be determined in relation to the training images to be able to provide robust accuracy performance if the images are acquired with the workpiece surfaces of interest within an acceptable depth of field (DOF) range of the camera system 260. The camera system DOF may be compared with the distance of the workpiece from the best focus distance to indicate the relative amount of focus or defocus in an image. An image captured with the workpiece within a range of one DOF centered on the best focus distance is considered to be in excellent focus, while an image captured with the workpiece at some greater distance from the best focus distance but below some threshold DOF range (e.g., 4× the DOF) may be considered to have an acceptable amount of defocus that still provides robust defect detection accuracy performance. In contrast, an image captured with the workpiece outside of the threshold DOF range (e.g., outside of the 4×DOF range, such as at 6×DOF further or closer to camera system than the best focus distance) may be considered to have an unacceptable amount of defocus that does not provide robust defect detection accuracy performance.

Figure 8A:
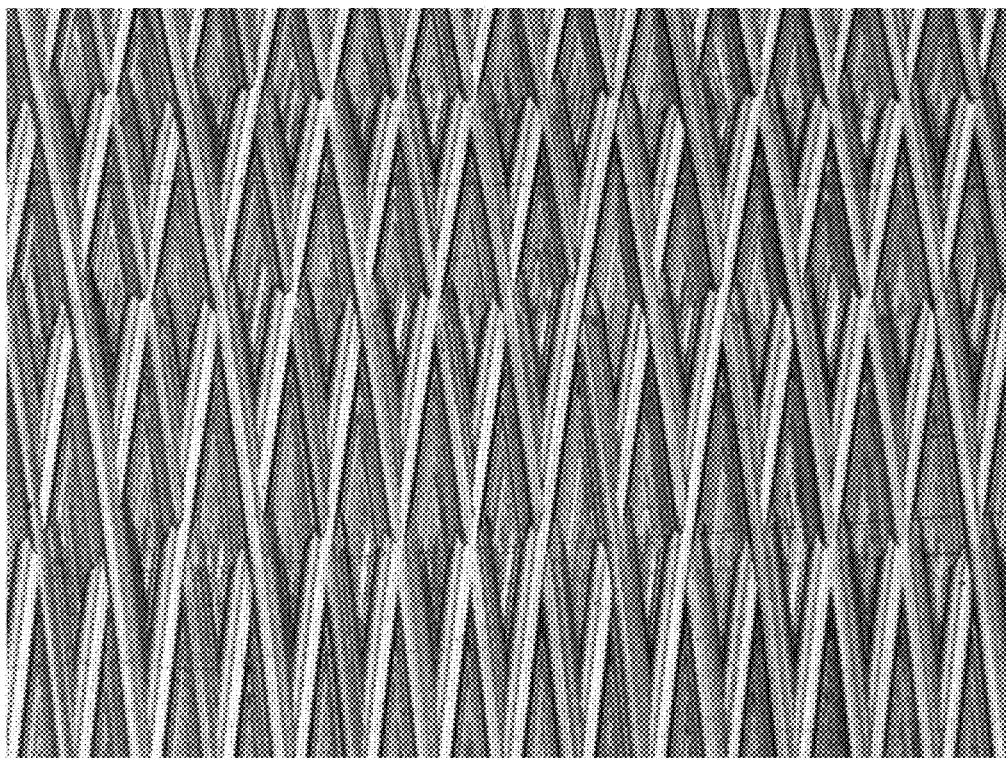
FIGS. 8A-8F are examples of images of similar portions of workpieces, with and without defects, and with varying levels of focus, as may be acquired by a machine vision inspection system similar to that of FIG. 1.
Figure 8B:
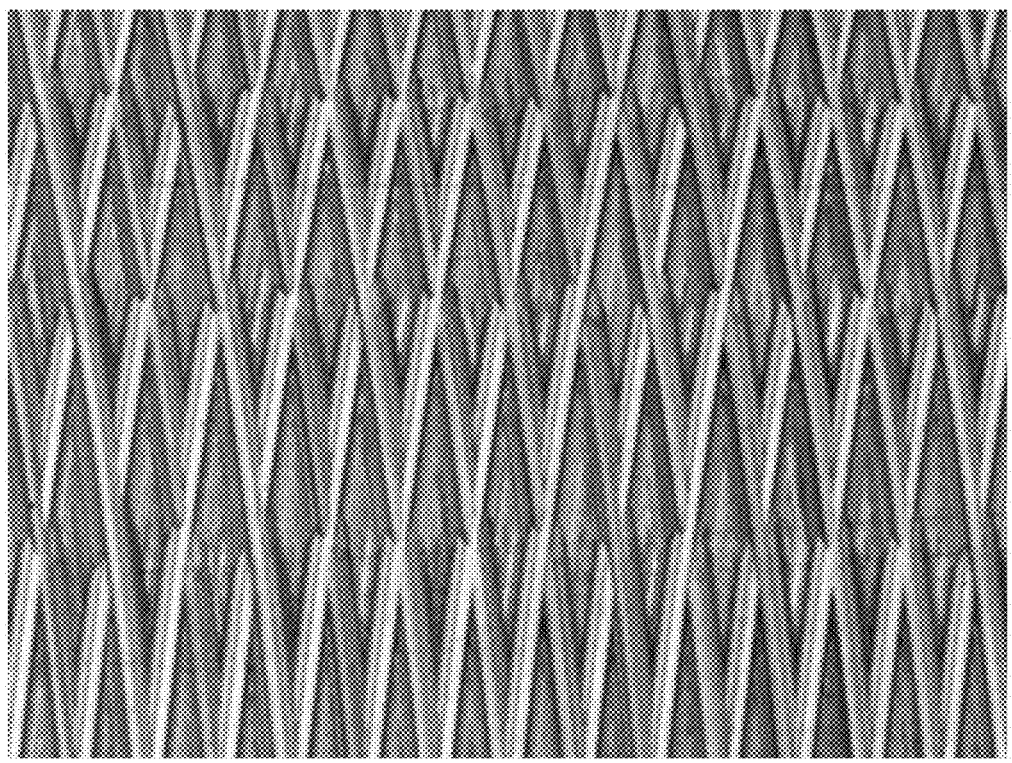
Figure 8C:
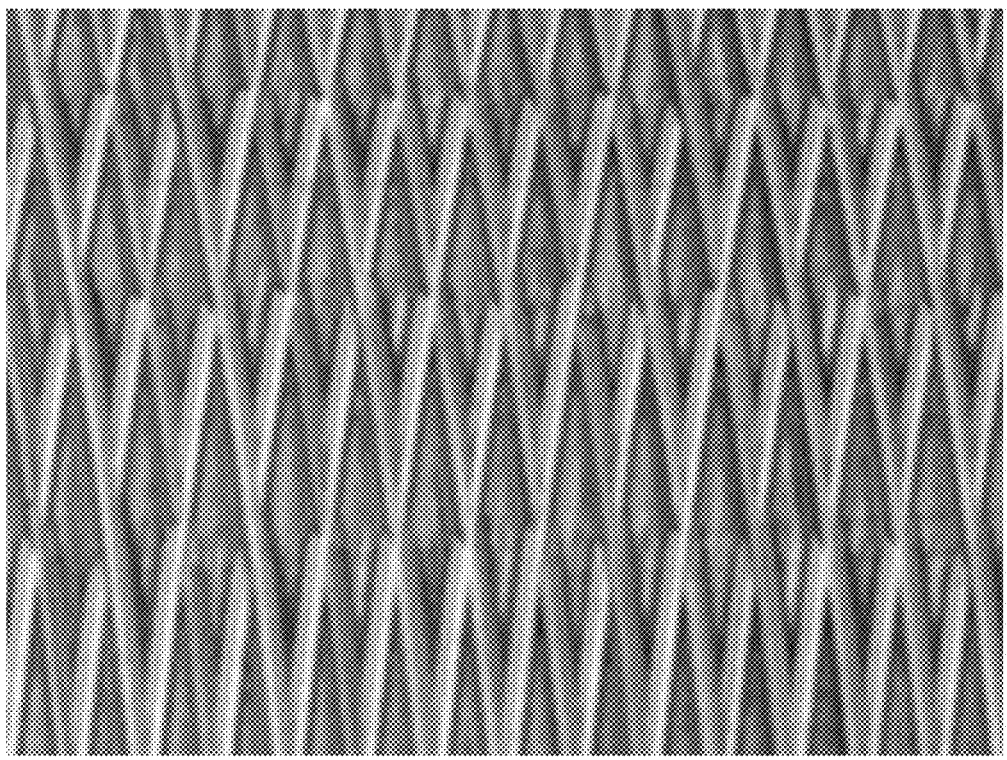
Figure 8D:
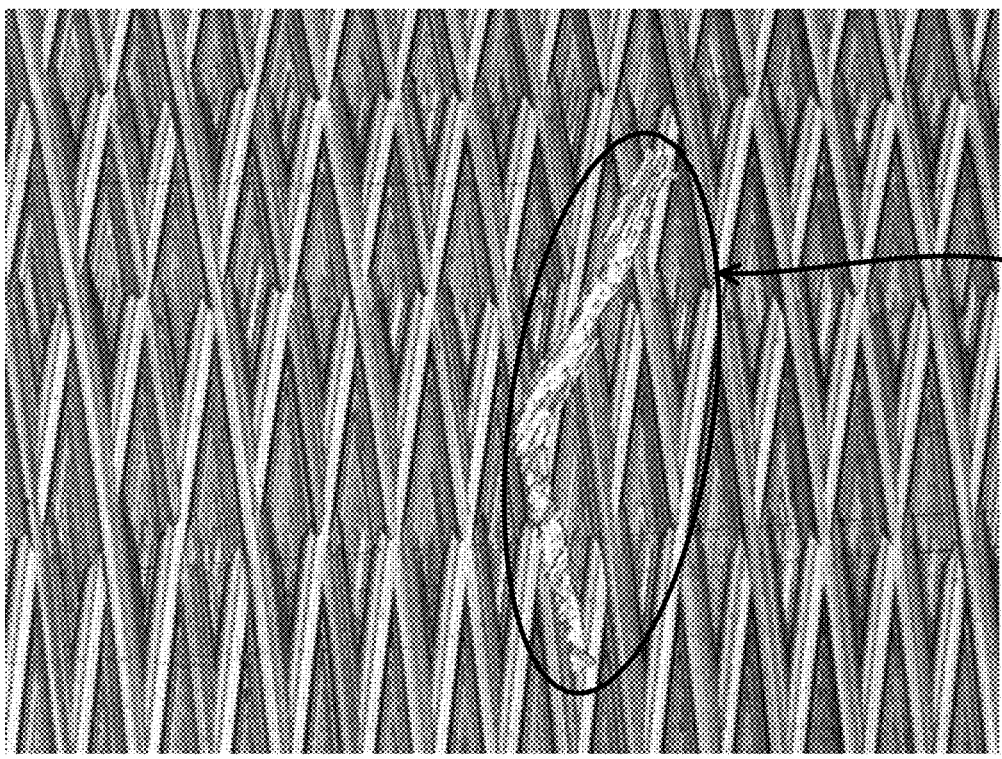
Figure 8E:
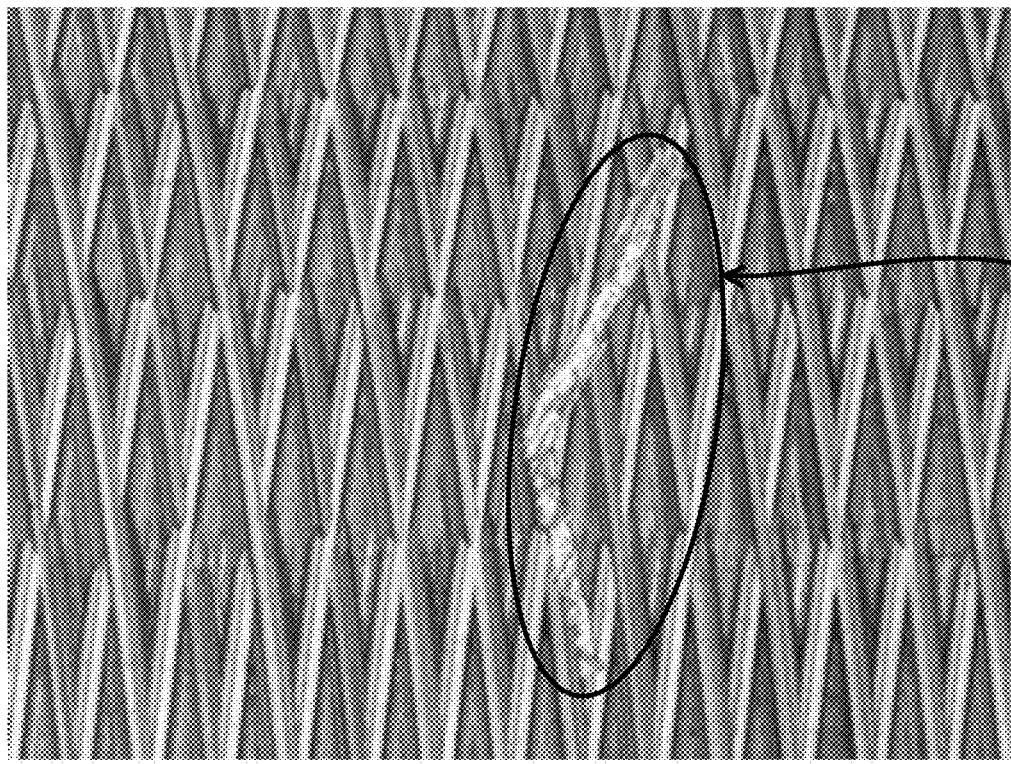
Figure 8F:
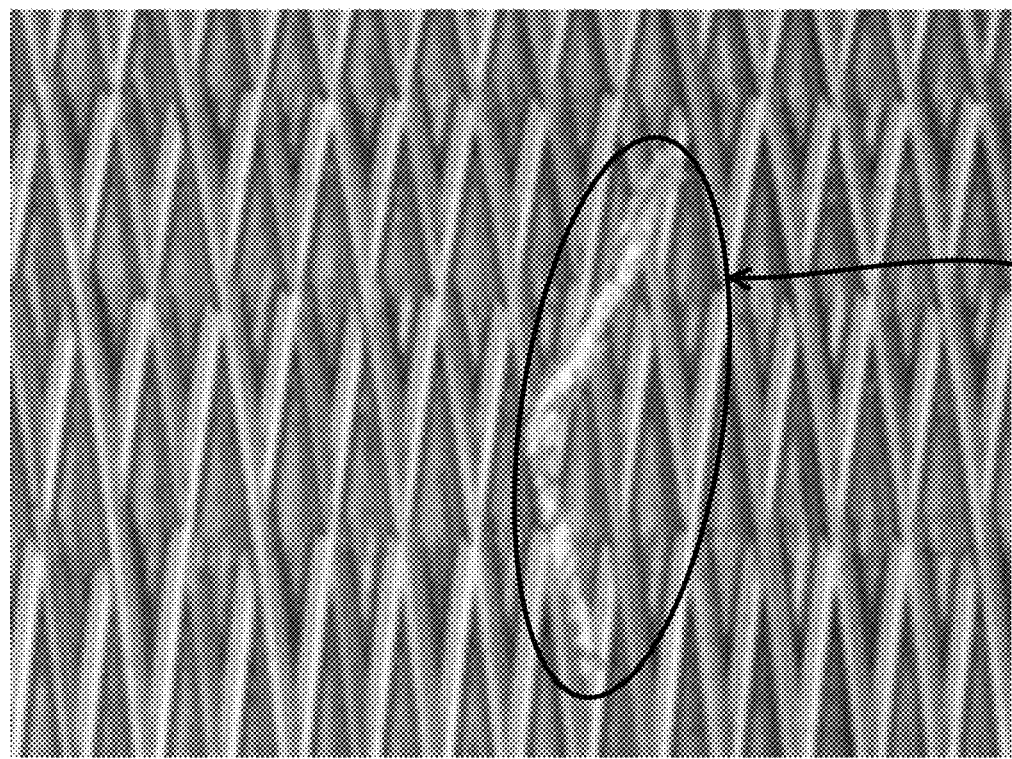

FIGS. 8A-8F are examples of images of similar portions of workpieces, with and without defects, and with varying levels of focus, as may be acquired by a machine vision inspection system similar to that of FIG. 1, such as during a run mode and/or as may be utilized as training images. In the examples of FIGS. 8A-8F, the images are of similar portions of workpieces (e.g., for which the types of machining marks formed on the surfaces of the portions are similar or nominally the same in each image and the primary difference between the images is the levels of focus). The images of FIGS. 8A-8C are non-defect images (e.g., as may be compared to the image of FIG. 5A) and the images of FIGS. 8D-8F are defect images (e.g., as may be compared to FIG. 5D and as including respective defects 802D-802F similar to defect 502D).

In one example implementation, the image data monitor and anomaly detector subsystem may be trained to classify image data as "normal" or "non-anomalous" if the image data indicates defocusing within four times the system DOF, and to classify the image data as "abnormal" or "anomalous" if the image data do not indicate defocusing within four times the baseline DOF. For example, if the image data monitor and anomaly detector subsystem determines that image data indicate defocusing by eight times the system DOF, the image data monitor and anomaly detector subsystem may classify the image data as "abnormal" or "anomalous" (e.g., and for which a designated action may be performed, such as providing a warning to a user and/or automatically adjusting the system such as adjusting the position of the lens or workpiece, etc. to achieve better focus.)

FIG. 8A is a non-defect image of a workpiece having a focus within the system DOF of the best focus. In accordance with the present example, the image data monitor and anomaly detector subsystem may classify image data corresponding to the image of FIG. 8A as "normal" or "non-anomalous".

FIG. 8B is a non-defect image of a workpiece that is defocused from best focus by four times the system DOF. If, for example, the defocus threshold for acceptable images is 4×DOF, then the amount of defocus in this image is within allowable tolerances, so no user warning should be provided. Thus, the image data monitor and anomaly detector subsystem may classify image data corresponding to the image of FIG. 8B as "normal" or "non-anomalous".

FIG. 8C is a non-defect image of a workpiece that is defocused from best focus by eight times the system DOF. In accordance with the present example, the image data monitor and anomaly detector subsystem may classify image data corresponding to the image of FIG. 8C as "abnormal" or "anomalous". Thus, the image data monitor and anomaly detector subsystem issues a user warning and/or takes another action regarding the images not being considered suitable for the defect detection process (e.g., adjusts a parameter or a position of a component of the camera system 260 that results in an acceptable DOF).

FIG. 8D is a defect image of a workpiece having a focus within the system DOF of the best focus. In accordance with the present example, the image data monitor and anomaly detector subsystem may classify image data corresponding to the image of FIG. 8D as "normal" or "non-anomalous".

FIG. 8E is a non-defect image of a workpiece that is defocused from best focus by four times the system DOF. In accordance with the present example, the image data monitor and anomaly detector subsystem may classify image data corresponding to the image of FIG. 8E as "normal" or "non-anomalous".

FIG. 8F is a non-defect image of a workpiece that is defocused defocused from best focus by eight times the system DOF. In accordance with the present example, the image data monitor and anomaly detector subsystem may classify image data corresponding to the image of FIG. 8F as "abnormal" or "anomalous".

As described above, image data corresponding to images similar to those shown in FIGS. 7A-7J and 8A-8F may correspond to run mode images which are classified by the image data monitor and anomaly detector subsystem as normal/non-anomalous or abnormal/anomalous. In various implementations, such images may also be representative of training images that may be included in a set of training images that is used to train the image data monitor and anomaly detector subsystem of the defect detection portion 140*dp*. Such images may in some implementations be based on image data that are augmented to have specific qualities that are useful in training the image data monitor and anomaly detector subsystem. For example, image data corresponding to an augmented set of images may be generated based on parameters indicating augmentation limits. In various implementations, the parameters indicating the augmentation limits may be defined automatically.

Figure 9:
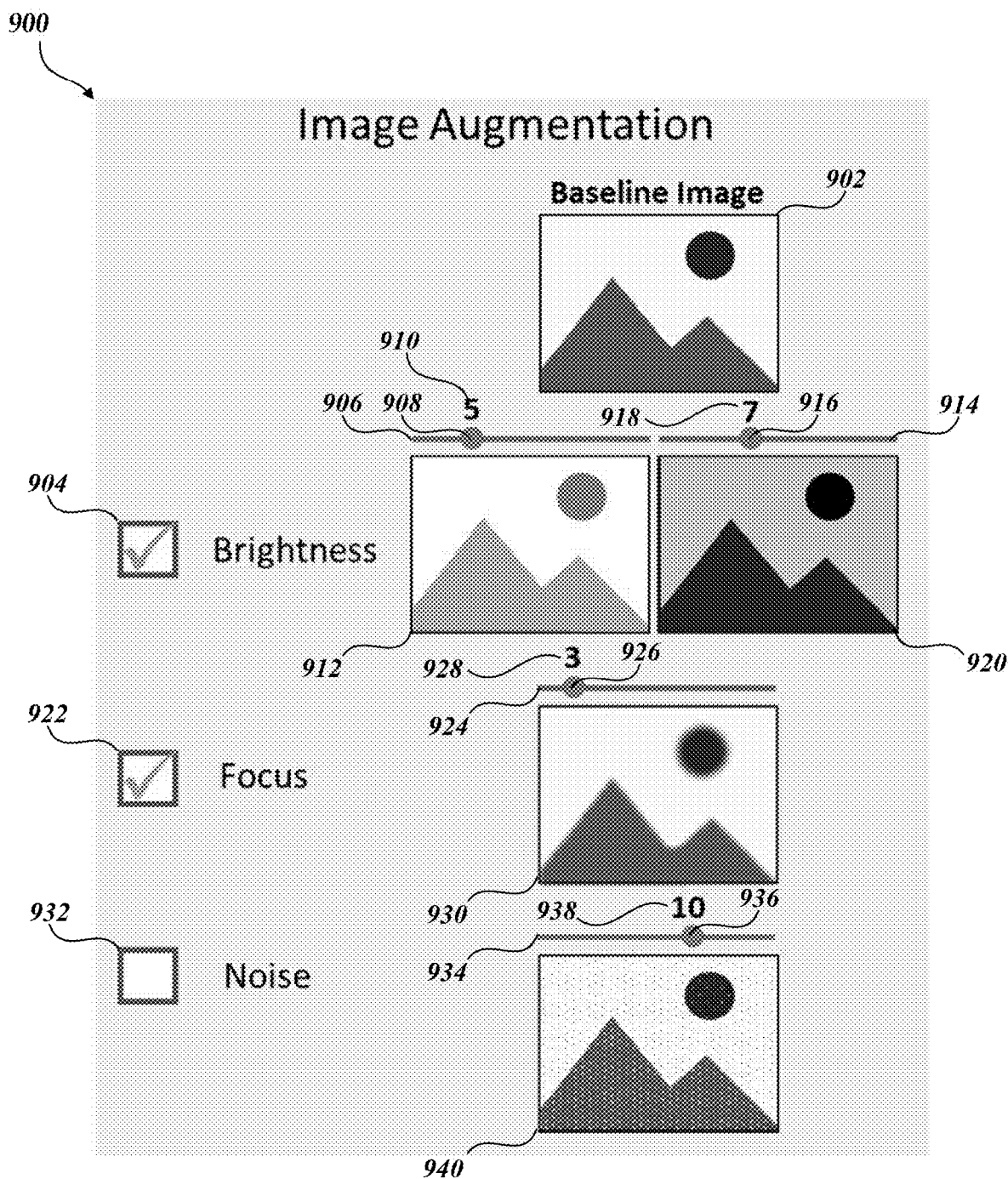
FIG. 9 is an example of an image augmentation user interface according to the present disclosure.

In addition, the parameters indicating the augmentation limits (e.g., for generating training images) may be defined under a user's control. FIG. 9 is an example of an image augmentation graphical user interface 900 that can be used to define the parameters indicating the augmentation limits. The image augmentation graphical user interface 900 displays a selected baseline image 902.

The image augmentation graphical user interface 900 includes a checkbox 904 that, when checked, enables a brightness augmentation functionality. The brightness augmentation functionality enables a user to specify a parameter indicating a lower brightness limit and a parameter indicating a higher brightness limit for generating augmented training images. More particularly, the graphical user interface 900 includes a slider 906 with a handle 908 that can be selected and moved with a user input device (e.g., mouse) to set a value 910 of the parameter indicating the lower brightness limit (e.g., 5), which is displayed. A corresponding image 912 is displayed, which is a copy of the baseline image 902 that is modified to have a lower brightness based on the parameter indicating the lower brightness limit. Similarly, the graphical user interface 900 includes a slider 914 with a handle 916 that can be moved to set a value 918 of the parameter indicating the higher brightness limit (e.g., 7). A corresponding image 920 is displayed, which is a copy of the baseline image 902 that is modified to have a higher brightness based on the parameter indicating the higher brightness limit.

The image augmentation graphical user interface 900 also includes a checkbox 922 that, when checked, enables a focus augmentation functionality. The focus augmentation functionality enables a user to specify a parameter indicating a range of acceptable focus for generating augmented training images. More particularly, the graphical user interface 900 includes a slider 924 with a handle 926 that can be selected and moved to set a value 928 of the parameter indicating the acceptable focus range about the best focus distance as a factor of the system depth of field (e.g., 3×DOF). A corresponding image 930 is displayed, which is a copy of the baseline image 902 that is modified to be defocused based on the parameter indicating the depth of field.

The image augmentation graphical user interface 900 also includes a checkbox 932 that, when checked, enables a noise augmentation functionality. The noise augmentation functionality enables a user to specify a parameter indicating an amount of noise for generating augmented training images. More particularly, the graphical user interface 900 includes a slider 934 with a handle 936 that can be selected and moved to set a value 938 of the parameter indicating the maximum amount of digital noise (e.g., 10) over which robust defect detection accuracy is desired. A corresponding image 940 is displayed, which is a copy of the baseline image 902 that is modified to include additional noise based on the parameter indicating the amount of noise.

The various parameters set using the image augmentation graphical user interface 900 can be used to generate additional image data for the set of augmented images. In various exemplary implementations, the same values (e.g., 910, 918, 928, 938) of the various augmentation parameters used to generate the image data corresponding to the images 912, 920, 930, and 940, based on the baseline image 902, can be applied to all or a selected subset of image data of a set of training images to generate additional image data for the augmented set of images.

Figure 10:
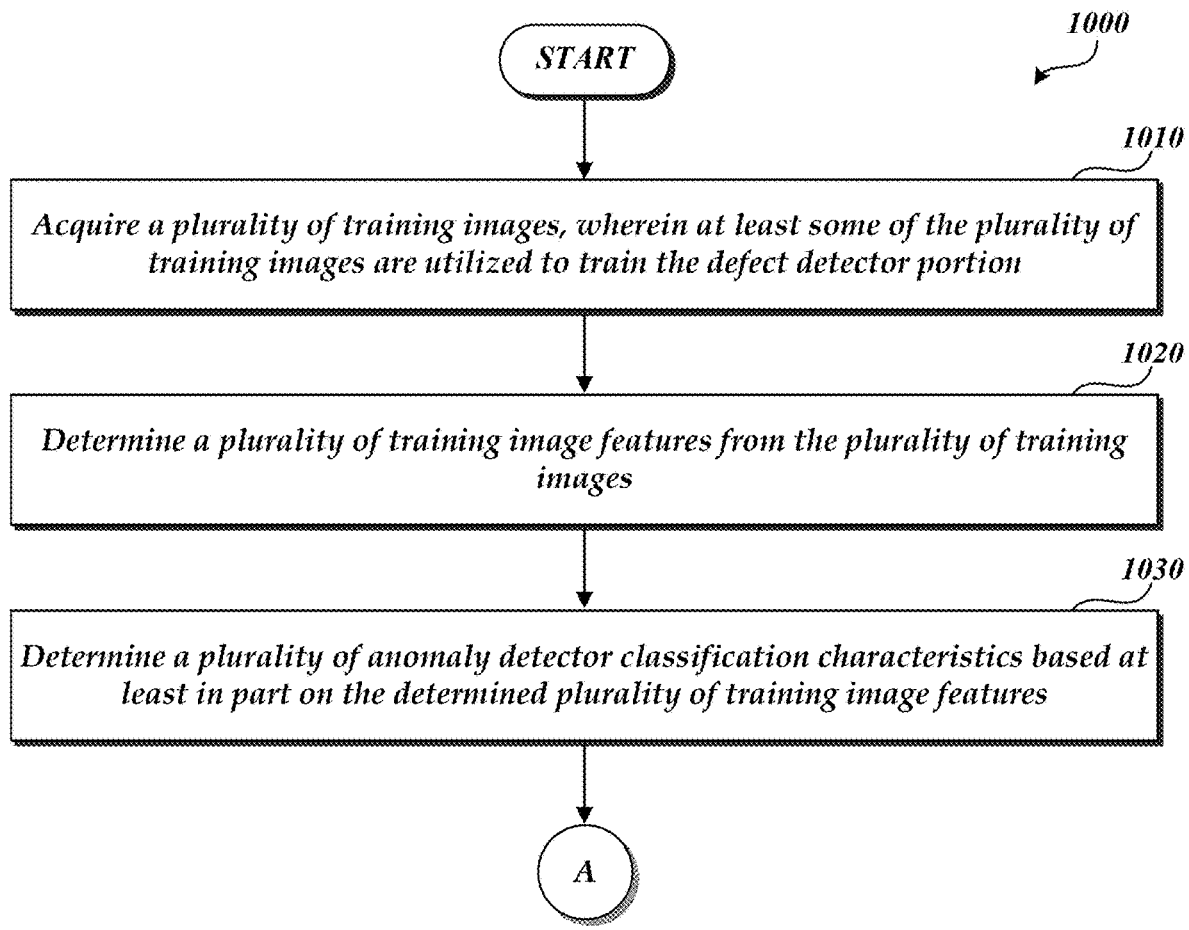
FIGS. 10 and 11 show a flow diagram of a method for operating a machine vision inspection system similar to that of FIG. 1.
Figure 11:
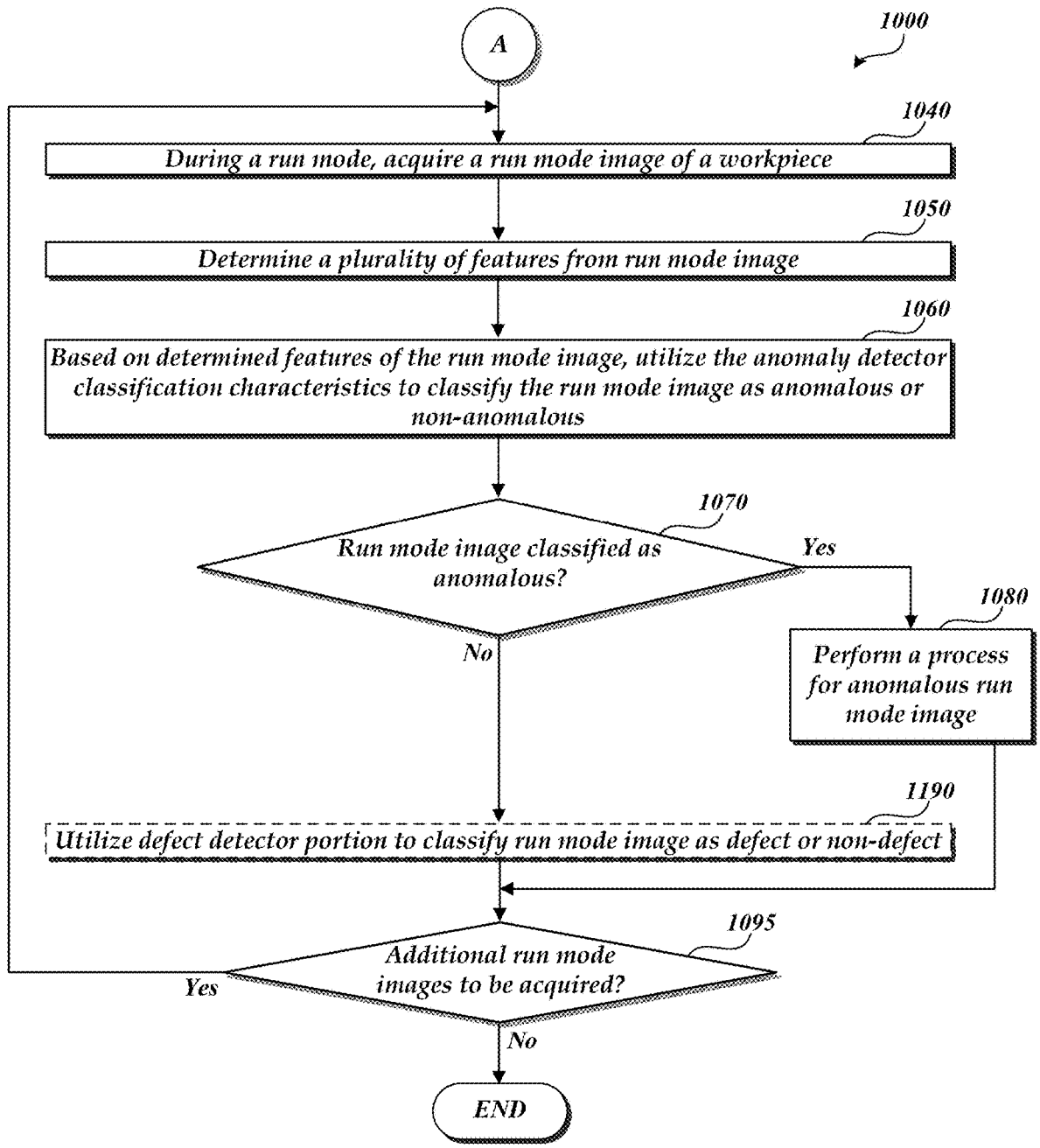

FIGS. 10 and 11 show a flow diagram of a method 1000 for operating a machine vision inspection system similar to that of FIG. 1. The method 1000 begins at 1010. At 1010, a plurality of training images is acquired. As a specific example, in one implementation some or all of the images of FIGS. 3A-3F, 4A-4E and 5A-5D may be acquired and utilized as training images. It will be appreciated that while a limited number of example training images are illustrated in the current figures, in various implementations different numbers of training images may be utilized (e.g., 50, 100, 150, etc.) In various implementations, at least some of the plurality of training images are utilized to train the defect detection portion. For example, the training images may include original images of workpieces acquired with the camera system 260 and input to the defect detection portion 140dp while it operates in a training mode (e.g., such as the images of FIGS. 3A-3F, 4A-4E and 5A-5D). In addition, the plurality of training images may include a set of augmented images, for example, created using the image augmentation graphical user interface 900 shown in FIG. 9. The method 1000 then proceeds to 1020.

At 1020, a plurality of training image features is determined from the plurality of training images acquired at 1010. In various implementations, the training image features (e.g., as automatically determined and/or determined at least in part by a system designer) may include features such as average image brightness, standard deviation of brightness, a grayscale histogram, dominant frequencies (e.g., obtained by performing a Fast Fourier Transform (FFT)), and an average contrast measure). The method 1000 then proceeds to 1030.

At 1030, based at least in part on the plurality of training image features determined at 1020, a plurality of anomaly detector classification characteristics is determined. In various exemplary implementations, an automatic process and/or a system designer may determine the anomaly detector classification characteristics based at least in part on the determined training image features. For example, it may be determined that image data having an average image brightness that is not within ±15% of a baseline image brightness are to be classified as anomalous, and/or that image data indicating defocusing from the best focus greater than four times the system depth of focus (DOF) are to be classified as anomalous; otherwise, the image data are to be classified as normal or non-anomalous. In various implementations, the training image features are extracted automatically (e.g., by a pre-trained Convolutional Neural Network, etc.), and for which a generalized model of the "normal" training dataset may be developed (e.g., defined, trained, fit, etc.) from the extracted features (e.g., for which different types of models may include: manually defined thresholds on selected features; vector similarity based thresholds (e.g., as may be manually tuned); single-class support vector machine (anomaly detector); or autoencoder (anomaly detector), etc.) In various alternative implementations, a synthetic dataset may also be created, in which various features may be altered/varied/perturbed (or not) to simulate anomalous and normal images, and for which a two-class classifier may be trained to be capable of distinguishing normal and anomalous images in the synthetic dataset. In various exemplary implementations, the two-class classifier may be used to classify features, and may be based on logistic regression analysis, nearest neighbor analysis, discriminant analysis, Naïve Bayes classifiers, a decision tree, a support vector machine (SVM), a neural network, an ensemble of classifiers, or a convolutional network trained on ImageNet, such as described by Zeiler and Fergus in "Visualizing and Understanding Convolutional Networks", arXiv:1311.2901v3 [cs.CV] 28 Nov. 2013, which is hereby incorporated herein by reference in its entirety. In conjunction with such processes, features that make the images anomalous may be identified (e.g., the reason for the anomaly may be identified, etc.) In various implementations when the training images include a set of augmented images, features may be extracted from the augmented images and for which at least some features may be defined at least in part by the augmentation types that were utilized (e.g., average image brightness, standard deviation of brightness, a grayscale histogram, dominant frequencies (FFT)), an average contrast measure, image noise measure, etc.), and for which in some instances a relatively simple limit-based anomaly detector may be created that considers features within the ranges of the augmented image set as "normal" and features outside of these ranges as "anomalous" (e.g., as may also allow for relatively simple identification of the feature (i.e., reason) which resulted in the image being classified as anomalous. The method 1000 then proceeds to 1040.

At 1040, a run mode image of a workpiece is acquired during a run mode. For example, the same camera system used to acquire the training images at 1010 is used to acquire the run mode image of the workpiece. The method 1000 then proceeds to 1050.

At 1050, a plurality of features from a run mode image is determined. For example, the features from the run mode image may include a value corresponding to an average brightness of the run mode image and a value corresponding to a level of defocusing. The method 1000 then proceeds to 1060.

At 1060, based on the plurality of features of the run mode image determined at 1050, the anomaly detector classification characteristics determined at 1030 are utilized to classify the run mode image acquired at 1040 as non-anomalous (e.g., acceptable for accurate defect detection) or anomalous (e.g., unacceptable for accurate defect detection). For example, if a determination is made at 1050 that the average brightness of the run mode image has a value that is characteristic of an anomaly and that the run mode image has a focus corresponding to a baseline DOF, based on the anomaly detector classification characteristics determined at 1030, the run mode image is classified as anomalous. By way of example, if the run mode image is classified as anomalous (e.g., as unacceptable for defect detection) or non-anomalous, the image may correspondingly be flagged as anomalous or non-anomalous, respectively (e.g., for which the flagged condition may be stored or otherwise indicated in association with the image data, etc.) The method 1000 then proceeds to 1070.

At 1070, whether the run mode image is classified as anomalous is determined. For example, a determination is made whether the file that includes image data corresponding to the run mode image is flagged as anomalous or non-anomalous, as indicating a corresponding anomalous or non-anomalous classification. If the run mode image is determined to be classified as anomalous, the method 1000 proceeds to 1080. If the run mode image is not determined to be classified as anomalous, the method 1000 proceeds to 1090.

At 1080, a process for an anomalous image is performed. For example, a designed action may be performed (e.g., a user can be alerted and/or the system can be adjusted, etc.) In various implementations, a reason for the anomaly may be identified (e.g., the feature or feature responsible for the image being anomalous may be identified), and in some instances a message or other indication may be provided to a user as to why the image is anomalous and/or the system may be correspondingly adjusted, etc. In various implementations, adjustments to the system may include adjusting an imaging condition, a lighting condition, a focus condition, and/or a workpiece condition. Examples of such adjustments may include adjusting a brightness of a light source, adjusting a position of the objective lens, and/or adjusting a position of the workpiece, etc.

Optionally at 1090 (or as may be performed at other times and/or in parallel with certain portions of the method 1000), the defect detection portion is utilized to determine if the run mode image is to be classified as a defect image. For example, image data corresponding to the run mode image may be input to a defect detector (e.g., as part of the defect detection portion 140dp). In one example implementation, the defect detector may be based on multi-label image classification with a neural network, which is implemented by the defect detection portion 140dp and has been trained to detect defects using a set of training images. In response, the defect detection portion may identify a plurality of pixels having characteristics of a defect within the workpiece image, and may correspondingly determine that the run mode image is classified as a defect image. The method 1000 then proceeds to 1095.

At 1095, a determination is made as to whether additional run mode images are to be acquired. For example, in response to a number of images continuing to be acquired and/or a user pressing a button or selecting an icon using a graphical user interface to indicate that another workpiece image is to be inspected, a determination is made that additional run mode images are to be acquired. If additional run mode images are to be acquired, the method 1000 returns to 1040. If additional run mode images are not to be acquired, the method 1000 ends.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein.

All of the U.S. patents and U.S. patent applications referred to in this specification are incorporated herein by reference, in their entirety. Aspects of the implementations can be modified, if necessary to employ concepts of the various patents and applications to provide yet further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. A workpiece inspection and defect detection system, comprising:
    a light source;
    a lens that inputs image light arising from a surface of a workpiece which is illuminated by the light source, and transmits the image light along an imaging optical path;
    a camera that receives imaging light transmitted along the imaging optical path and provides an image of the workpiece;
    one or more processors; and
    a memory coupled to the one or more processors and storing program instructions that when executed by the one or more processors cause the one or more processors to at least:

acquire a plurality of training images, wherein at least some of the plurality of training images are utilized to train a defect detection portion;
determine a plurality of training image features from the plurality of training images;
determine a plurality of anomaly detector classification characteristics based at least in part on the determined training image features;
utilize the camera to acquire a first run mode image of a workpiece;
determine a plurality of features from the first run mode image of the workpiece;
based at least in part on the determined features from the first run mode image of the workpiece, utilize the anomaly detector classification characteristics to determine if the first run mode image of the workpiece is to be classified as anomalous;
utilize the anomaly detector classification characteristics to determine that a second run mode image of a workpiece is to be classified as non-anomalous; and
utilize the defect detection portion to analyze the second run mode image to determine if the second run mode image of the workpiece is to be classified as a defect image that includes a defect of the workpiece.

2. The system of claim 1, wherein the first run mode image of the workpiece is classified as anomalous in accordance with the utilization of the anomaly detector classification characteristics.

3. The system of claim 2, wherein the program instructions when executed by the one or more processors further cause the one or more processors to:
generate a message indicating that there is a problem with at least one of an imaging condition, a lighting condition, or a workpiece condition based at least in part on the classification of the first run mode image of the workpiece as anomalous.

4. The system of claim 2, wherein the program instructions when executed by the one or more processors further cause the one or more processors to:
determine a reason that the first run mode image of the workpiece is classified as anomalous.

5. The system of claim 4, wherein the program instructions when executed by the one or more processors further cause the one or more processors to:
generate a message indicating the reason that the first run mode image of the workpiece is classified as anomalous.

6. The system of claim 4, wherein the program instructions when executed by the one or more processors further cause the one or more processors to:
after the reason that the first run mode image is classified as anomalous is determined, adjust at least one of a brightness of the light source, or a position of a light source, or a position of the lens or lens elements relative to at least one of the camera or workpiece.

7. A method of operating a workpiece inspection and defect detection system, the method comprising:
utilizing a light source, a lens and a camera of the workpiece inspection and defect detection system for acquiring a plurality of training images, wherein at least some of the plurality of training images are utilized to train a defect detection portion;
determining a plurality of training image features from the training images;
determining a plurality of anomaly detector classification characteristics based at least in part on the training image features;
acquiring a first run mode image of a workpiece;
determining a plurality of features from the first run mode image of the workpiece;
based at least in part on the determined features from the first run mode image of the workpiece, utilizing the anomaly detector classification characteristics to determine if the first run mode image of the workpiece is to be classified as anomalous;
utilizing the anomaly detector classification characteristics to determine that a second run mode image of a workpiece is to be classified as non-anomalous; and
utilizing the defect detection portion to analyze the second run mode image to determine if the second run mode image of the workpiece is to be classified as a defect image that includes a defect of the workpiece.

8. The method of claim 7, wherein the first run mode image of the workpiece is classified as anomalous in accordance with the utilization of the anomaly detector classification characteristics.

9. The method of claim 8, wherein:
the method further comprises generating a message indicating that there is a problem with an imaging condition, a lighting condition, or a workpiece condition based at least in part on the classification of the first run mode image of the workpiece as anomalous.

10. The method of claim 8, wherein:
the method further comprises determining a reason that the first run mode image is classified as anomalous.

11. The method of claim 10, further comprising:
generating a message indicating the reason that the first run mode image of the workpiece is classified as anomalous.

12. The method of claim 10, further comprising:
after the determining the reason that the first run mode image is classified as anomalous, adjusting at least one of a brightness of the light source or a position of a light source, or a position of the lens or lens elements relative to at least one of the camera or workpiece.

13. A non-transitory computer-readable medium storing program instructions that when executed by one or more processors cause the one or more processors to at least:
utilize a light source, a lens and a camera of a workpiece inspection and defect detection system to acquire a plurality of training images, wherein at least some of the plurality of training images are utilized to train a defect detection portion;
determine a plurality of training image features from the plurality of training images;
determine a plurality of anomaly detector classification characteristics based at least in part on the determined training image features;
utilize the camera to acquire a first run mode image of a workpiece;
determine a plurality of features from the first run mode image of the workpiece;
based at least in part on the determined features from the first run mode image of the workpiece, utilize the anomaly detector classification characteristics to determine if the first run mode image of the workpiece is to be classified as anomalous;
utilize the anomaly detector classification characteristics to determine that a second run mode image of a workpiece is to be classified as non-anomalous; and
utilize the defect detection portion to analyze the second run mode image to determine if the second run mode image is a defect image that includes a defect of the workpiece.

14. The non-transitory computer-readable medium of claim 13, wherein the first run mode image of the workpiece is classified as anomalous in accordance with the utilization of the anomaly detector classification characteristics.

15. The non-transitory computer-readable medium of claim 14, wherein the program instructions when executed by the one or more processors further cause the one or more processors to:
generate a message indicating that there is a problem with at least one of an imaging condition, a lighting condition, or a workpiece condition based at least in part on the classification of the first run mode image of the workpiece as anomalous.

16. The non-transitory computer-readable medium of claim 14, wherein the program instructions when executed by the one or more processors further cause the one or more processors to:
determine a reason that the first run mode image of the workpiece is classified as anomalous; and
generate a message indicating the reason that the first run mode image of the workpiece is classified as anomalous.

17. The non-transitory computer-readable medium of claim 16, wherein the program instructions when executed by the one or more processors further cause the one or more processors to:
after the reason that the first run mode image of the workpiece is classified as anomalous is determined, adjust at least one of a brightness of the light source, or a position of a light source, or a position of the lens or lens elements relative to at least one of the camera or workpiece.

18. A method of operating a workpiece inspection and defect detection system, the method comprising:
utilizing a light source, a lens and a camera of the workpiece inspection and defect detection system for acquiring a plurality of training images, wherein at least some of the plurality of training images are utilized to train a defect detection portion;
determining a plurality of training image features from the training images;
determining a plurality of anomaly detector classification characteristics based at least in part on the training image features, wherein the determining of the plurality of anomaly detector classification characteristics based at least in part on the training image features comprises:
creating a synthetic dataset in which a plurality of the training image features are altered to simulate anomalous images and are not altered to simulate non-anomalous images; and
training a two-class classifier capable of distinguishing anomalous and non-anomalous images in the synthetic dataset;
acquiring a first run mode image of a workpiece;
determining a plurality of features from the first run mode image of the workpiece; and
based at least in part on the determined features from the first run mode image of the workpiece, utilizing the anomaly detector classification characteristics to determine if the first run mode image of the workpiece is to be classified as anomalous.

19. The method of claim 18, wherein:
the first run mode image of the workpiece is classified as anomalous in accordance with the utilization of the anomaly detector classification characteristics; and
the method further comprises generating a message indicating that there is a problem with an imaging condition, a lighting condition, or a workpiece condition based at least in part on the classification of the first run mode image of the workpiece as anomalous.

20. The method of claim 18, wherein:
the first run mode image of the workpiece is classified as anomalous in accordance with the utilization of the anomaly detector classification characteristics; and
the method further comprises:
determining a reason that the first run mode image is classified as anomalous; and
generating a message indicating the reason that the first run mode image of the workpiece is classified as anomalous.

21. The method of claim 18, wherein:
the first run mode image of the workpiece is classified as anomalous in accordance with the utilization of the anomaly detector classification characteristics; and
the method further comprises:
determining a reason that the first run mode image is classified as anomalous; and
based at least in part on the determined reason that the first run mode image is classified as anomalous, adjusting at least one of a brightness of the light source or a position of a light source, or a position of the lens or lens elements relative to at least one of the camera or workpiece.

* * * * *